US012613419B2

(12) United States Patent
Zheng

(10) Patent No.: US 12,613,419 B2
(45) Date of Patent: Apr. 28, 2026

(54) DIFFRACTIVE WAVEGUIDE APPARATUS, NEAR-EYE DISPLAY DEVICE, AND MANUFACTURING METHOD FOR DIFFRACTIVE WAVEGUIDE APPARATUS

(71) Applicant: GUANGDONG OPPO MOBILE TELECOMMUNICATIONS CORP., LTD., Dongguan (CN)

(72) Inventor: Guang Zheng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 280 days.

(21) Appl. No.: 18/519,659

(22) Filed: Nov. 27, 2023

(65) Prior Publication Data

US 2024/0094545 A1      Mar. 21, 2024

Related U.S. Application Data

(63) Continuation of application No. PCT/CN2022/085887, filed on Apr. 8, 2022.

(30) Foreign Application Priority Data

May 27, 2021      (CN) .......................... 202110585751.4

(51) Int. Cl.
*G02B 27/01* (2006.01)
*G02B 6/34* (2006.01)

(52) U.S. Cl.
CPC ........... *G02B 27/0172* (2013.01); *G02B 6/34* (2013.01); *G02B 2027/0123* (2013.01)

(58) Field of Classification Search
CPC .............................. G02B 27/0172; G02B 6/34
See application file for complete search history.

(56) References Cited

U.S. PATENT DOCUMENTS 10,409,059 B2 * 9/2019 Mason ..................... G02B 6/34
2020/0209630 A1 * 7/2020 Schultz .............. G02B 27/4272
(Continued)

FOREIGN PATENT DOCUMENTS

CN          209167585 U          7/2019
CN          111065953 A          4/2020
(Continued)

OTHER PUBLICATIONS

Notification to Grant Patent Right for Invention, Chinese Application No. 202121171086.6, mailed Oct. 15, 2021.
(Continued)

*Primary Examiner* — Tina Wong
(74) *Attorney, Agent, or Firm* — Ladas & Parry, LLP

(57) ABSTRACT

A diffractive light waveguide apparatus, a near-eye display device, and a manufacturing method for a diffractive light waveguide apparatus are provided. The diffractive light waveguide apparatus includes a waveguide substrate and a grating structure. The grating structure is arranged on a surface of the waveguide substrate and includes multiple grating units, the multiple grating units have a first period in a first direction and a second period in a second direction, and the second direction is different from the first direction. The first period and the second period are adjustable to cause a two-dimensional pupil expansion angle of the grating structure to be 180°.

19 Claims, 27 Drawing Sheets

(56) References Cited

U.S. PATENT DOCUMENTS

| | | | |
|---|---|---|---|
| 2020/0264367 | A1 | 8/2020 | Huang et al. |
| 2021/0199970 | A1* | 7/2021 | Huang ............... G02B 27/0172 |

FOREIGN PATENT DOCUMENTS

| | | | |
|---|---|---|---|
| CN | 111175881 | A | 5/2020 |
| CN | 111373297 | A | 7/2020 |
| CN | 111552030 | A | 8/2020 |
| CN | 111812841 | A | 10/2020 |
| CN | 112630969 | A | 4/2021 |
| CN | 113156581 | A | 7/2021 |
| CN | 214623106 | U | 11/2021 |
| WO | 2022247487 | A1 | 12/2022 |

OTHER PUBLICATIONS

International Search Report, International Application No. PCT/CN2022/085887, mailed Jun. 28, 2022.
Written Opinion of the International Searching Authority in International Application No. PCT/CN2022/085887, mailed Jun. 28, 2022, with machine English translation provided by WIPO and by applicant's foreign counsel.
Chinese First Office Action in Chinese Patent Application No. 202110585751.4, mailed Dec. 30, 2024.
Rejection decision in the corresponding Chinese Patent Application No. 202110585751.4, issued on Jun. 14, 2025.

* cited by examiner

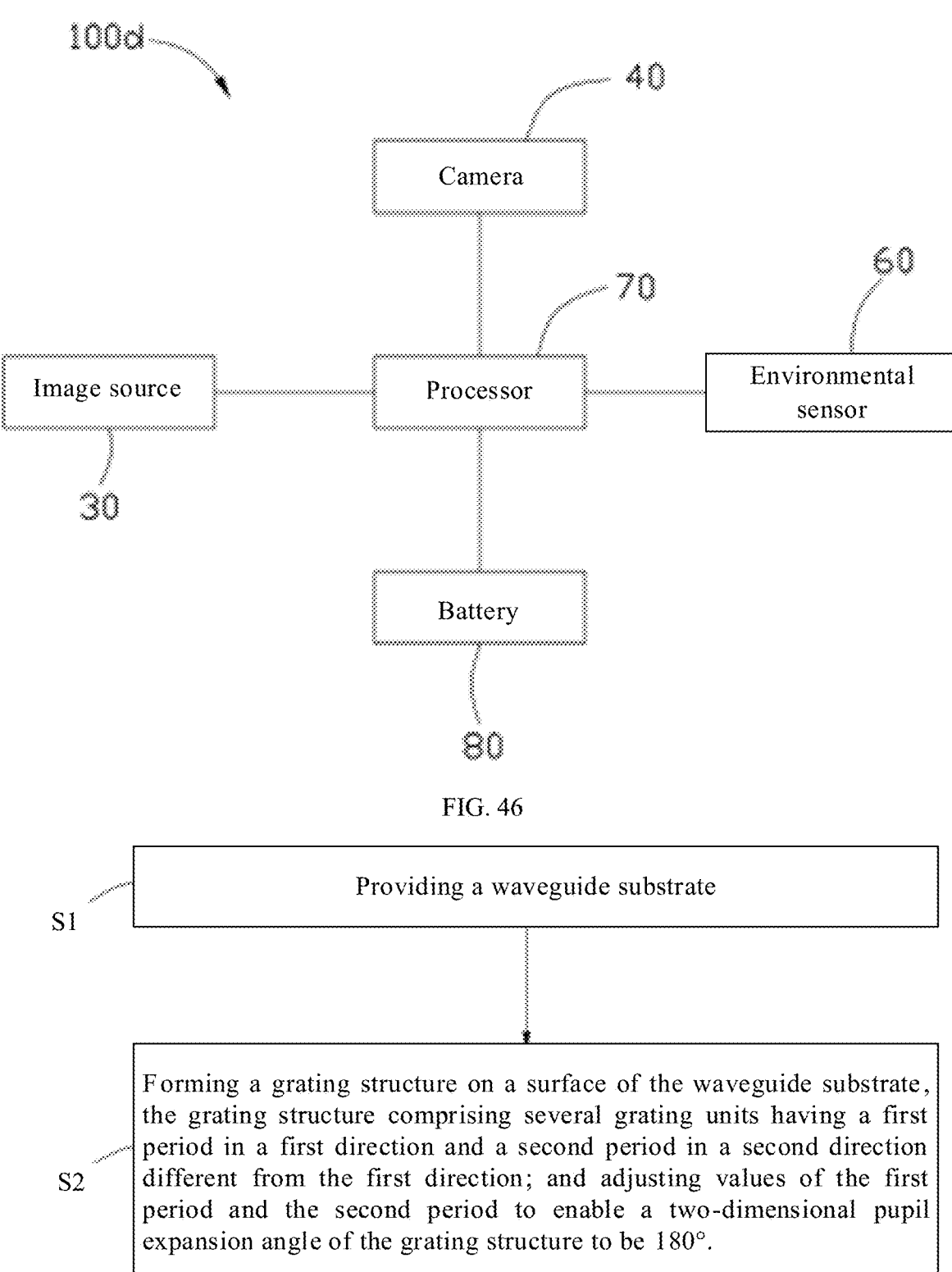

FIG. 46

S1 — Providing a waveguide substrate

S2 — Forming a grating structure on a surface of the waveguide substrate, the grating structure comprising several grating units having a first period in a first direction and a second period in a second direction different from the first direction; and adjusting values of the first period and the second period to enable a two-dimensional pupil expansion angle of the grating structure to be 180°.

FIG. 47

DIFFRACTIVE WAVEGUIDE APPARATUS, NEAR-EYE DISPLAY DEVICE, AND MANUFACTURING METHOD FOR DIFFRACTIVE WAVEGUIDE APPARATUS

CROSS REFERENCE TO RELATED APPLICATIONS

The present disclosure is a continuation of International Patent Application No. PCT/CN2022/085887, filed Apr. 8, 2022, which claims priority to Chinese Patent Application No. 202110585751.4, filed May 27, 2021, in the China National Intellectual Property Administration, both of which are herein incorporated by reference in their entireties.

TECHNICAL FIELD

The present disclosure relates to the field of diffractive optical device technologies, in particular to a diffractive light waveguide apparatus, a near-eye display device, and a manufacturing method for a diffractive light waveguide apparatus.

BACKGROUND

With the development of technologies, an augmented reality (AR) display device, such as AR glasses, may be needed to see both an external real world and virtual images. A near-eye display device commonly includes a diffractive waveguide system. A conventional grating-based diffractive waveguide system can be divided into two types, diffractive waveguide, where the first type is a diffractive waveguide system with three or more one-dimensional grating regions, and the second type is a two-dimensional diffractive waveguide system with two grating regions. The first type of diffractive waveguide system includes a waveguide substrate, an input coupled grating (ICG), an orthogonal pupil expander (OPE), and an output coupled grating (i.e., exit pupil expander, EPE). A light generated by an image source for displaying an image enters the waveguide substrate through the input coupled grating, is subjected to a pupil expansion through the orthogonal pupil expander, and then is coupled out through the output coupled grating and emitted into a human eye. The second type of diffractive waveguide system includes a waveguide substrate, an input coupled grating, and a two-dimensional output coupled grating. A light generated by an image source for displaying an image enters the waveguide substrate through the input coupled grating, and then is coupled out through the output coupled grating and emitted into the human eye.

However, for the first type of diffractive waveguide system, the output coupled grating has a small setup area due to the orthogonal pupil expander occupying a portion of the waveguide substrate, such that a utilization rate of the waveguide substrate is low, thereby limiting a range of eye movements (eye box). As shown in FIG. 1, a conventional two-dimensional grating in the second type of diffractive waveguide system is mainly adopted with a periodic structure of hexagonal lattices. A pupil expansion angle of the periodic structure is 120°, such that a portion of the grating region is required to be pupil-expanded. That is, a broken line block $a_0$ in FIG. 1 represents a valid output coupled grating region, while the grating on the left of the broken line block $a_0$ is an invalid output coupled grating for pupil expansion, which leads to a reduction of a valid output coupled grating area.

SUMMARY

In a first aspect, a diffractive waveguide apparatus is provided by the present disclosure and includes a waveguide substrate and a grating structure. The grating structure is arranged on a surface of the waveguide substrate and includes multiple grating units, the multiple grating units have a first period in a first direction and a second period in a second direction, and the second direction is different from the first direction. The first period and the second period are adjustable to cause a two-dimensional pupil expansion angle of the grating structure to be 180°.

In a second aspect, a near-eye display device is provided by the present disclosure and includes the diffractive waveguide apparatus in the first aspect.

In a third aspect, a manufacturing method for a diffractive waveguide apparatus is provided by the present disclosure and includes providing a waveguide substrate; and forming a grating structure on a surface of the waveguide substrate. The grating structure includes multiple grating units, the multiple grating units have a first period in a first direction and a second period in a second direction, the second direction is different from the first direction, the first period and the second period are adjustable to cause a two-dimensional pupil expansion angle of the grating structure to be 180°.

BRIEF DESCRIPTION OF THE DRAWINGS

In order to make the technical solution described in embodiments of the present disclosure more clearly, the drawings used for description of the embodiments will be described. Apparently, the drawings in the following description illustrate some embodiments of the present disclosure. For those skilled in the art, other drawings may be acquired according to the drawings without any creative work.

FIG. 29 is a schematic diagram of a light propagation in the two-dimensional output coupled grating shown in FIG. 1.

FIG. 30 is a schematic diagram of a light propagation in the output coupled grating shown in FIG. 28.

FIG. 46 is a schematic diagram of s near-eye display device according to still another embodiment of the present disclosure.

FIG. 47 is a flowchart of a manufacturing method for a diffractive waveguide apparatus according to some embodiments of the present disclosure.

REFERENCE NUMERALS

Figure 1:
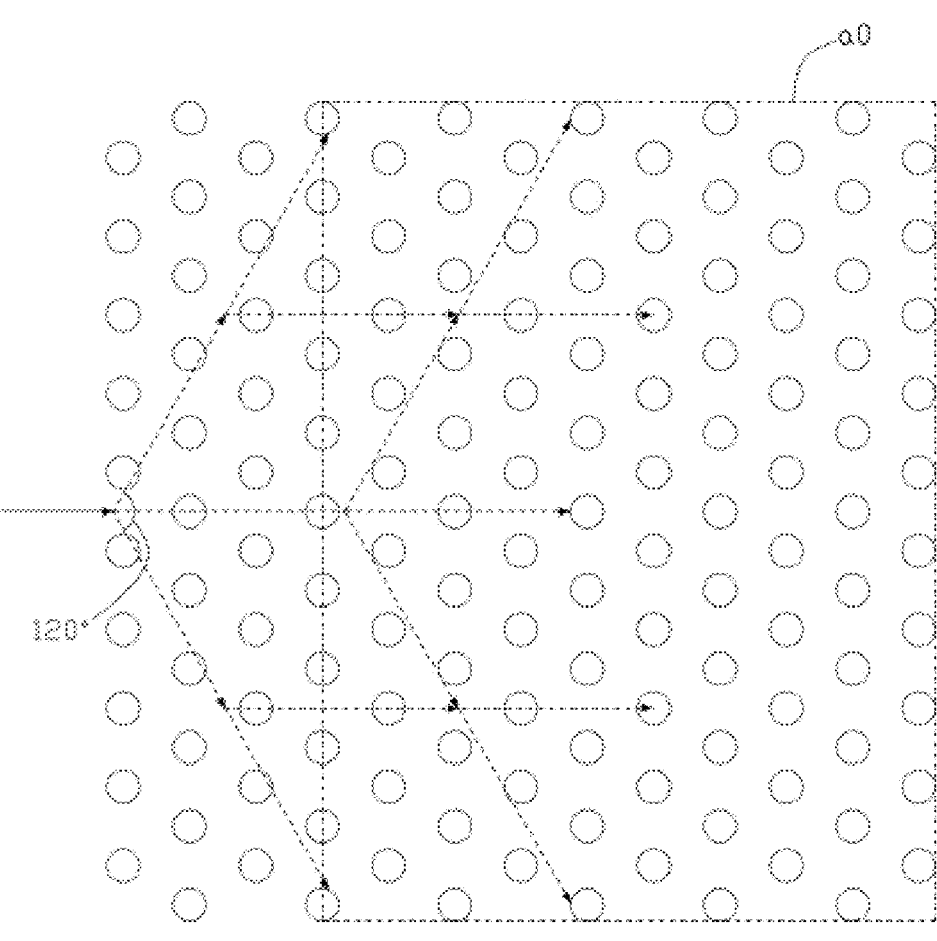
FIG. 1 is a schematic diagram of a pupil expansion for a light performed by a two-dimensional output coupled grating in the related art.

20, diffractive waveguide apparatus; 21, 21*a*, waveguide substrate; 211, 211*a*, first surface; 213. second surface; 22, 22*a*, 22*b*, 22*c*, 22*d*, 22*e*, 22*f*, 22*g*, 22*h*, 22*i*, 22*j*, 22*k*, 22*n*, 22*m*, grating structure; 221, 221*c*, 221*d*, 221*e*, 221*f*, 221*g*, 221*h*, 221*i*, 221*j*, 221*k*, 221*n*, grating unit; 222. output coupled grating; 225. input coupled grating; 226. protective sheet; 30. image source; 40. camera; 50. human eye; 60. environmental sensor; 70. processor; 80. battery; 2112. first step surface; 2114. second step surface; 2116. third step surface; 2212. first grating unit; 2214. second grating unit; 2216. third grating unit; 100, 100*a*, 100*b*, 100*c*, 100*d*, near-eye display device; 130. wearing frame; 131. viewing window region; 160. wearing holder; 170. optical lens component.

DETAILED DESCRIPTION

A diffractive waveguide apparatus is provided by the present disclosure and includes a waveguide substrate and a grating structure. The grating structure is arranged on a surface of the waveguide substrate and includes multiple grating units, the multiple grating units have a first period in a first direction and a second period in a second direction, and the second direction is different from the first direction. The first period and the second period are adjustable to cause a two-dimensional pupil expansion angle of the grating structure to be 180°.

The diffractive waveguide apparatus satisfies: in a field of view distribution of a normalized k-space of the grating structure, a horizontal axis is $\lambda k_x/2\pi$, a vertical axis is $\lambda k_y/2\pi$; a radius of an inner circle is an environmental refractive index, and a radius of an outer circle is a refractive index of a waveguide substrate, the inner circle and the outer circle being concentric; a center field of view is located in the inner circle, fields of view with a (0,0) order diffraction and a (−1, ±1) order diffraction are located in a ring formed between the inner circle and the outer circle, and fields of view with a (0, ±1) order diffraction are located outside the outer circle to avoid the (0, ±1) order diffraction; a pupil expansion angle of the center field of view is 180°; where $\lambda$ is a wavelength, $k_x$ is a grating vector along a x-direction in the reciprocal space, and $k_y$ is grating vector along a y-direction in the reciprocal space.

A range of an included angle $\theta$ between the first direction and the second direction is: $80° \leq \theta \leq 100°$.

A mode length of the first period is equal to N times a mode length of the second period, and $0.5 \leq N \leq 2$.

the multiple grating units are arrayed into a rectangular region, a centerline, parallel to the first direction, of the rectangular region is served as a symmetrical axis of the rectangular region, and duty cycles of the multiple grating units, on both opposite sides of the centerline, are adjusted to modulate a diffraction efficiency of the multiple grating units.

Radial sizes of the multiple grating units gradually increase from the centerline along the second direction.

Radial sizes of the multiple grating units gradually increase along the first direction, and gradually increase from the centerline along the second direction.

Heights of the multiple grating units gradually increase or decrease from the centerline towards two opposite sides along the second direction.

The surface of the waveguide substrate is a step surface, and the step surface includes a first step surface in a middle and two second step surfaces on two opposite sides of the first step surface; the multiple grating units are arranged on the first step surface and the two second step surfaces, and end surfaces, away from the surface, of the multiple grating units are coplanar.

A height of each grating unit on the first step surface is less than a height of each grating unit on each of the two second step surfaces.

A first mode length of the first period is 260 nm to 500 nm, and a second mode length of the second period is 260 nm to 500 nm.

The grating structure includes an input coupled grating and an output coupled grating that are arranged on the waveguide substrate; the input coupled grating is configured to couple a light in the waveguide substrate; the output coupled grating includes several of the multiple grating units, and the output coupled grating is configured to receive a light totally reflected by the waveguide substrate, perform a two-dimensional pupil expansion on the light, and couple the light out of the waveguide substrate.

The waveguide substrate includes a first surface and a second surface arranged opposite to each other, and the input coupled grating and the coupled grating are both arranged on the first surface or the second surface; or the input coupled grating is arranged on one of the first surface and the second surface, and the output coupled grating is arranged on the other of the first surface and the second surface.

The included angle, between the first direction and the second direction, of the several of the multiple grating units of the output coupled grating is 90°; an absolute value of the mode length of the first period is equal to N times an absolute value of the mode length of the second period, and a range of N is $0.5 \leq N \leq 2$; an output coupled grating region of the output coupled grating is rectangular in shape, and the two-dimensional pupil expansion angle of the output coupled grating is 180°.

The included angle, between the first direction and the second direction, of the several of the multiple grating units of the output coupled grating is 90°, an absolute value of the mode length of the first period is equal to an absolute value of the mode length of the second period; an output coupled grating region of the output coupled grating is rectangular in shape, and the two-dimensional pupil expansion angle of the output coupled grating is 180°.

The output coupled grating is integrated with the waveguide substrate.

A projection of the input coupled grating in the first direction is located in a region of the output coupled grating; or a projection of the input coupled grating in the second direction is located in the region of the output coupled grating.

A near-eye display device is provided by the present disclosure and includes any one of the diffractive waveguide apparatuses mentioned above.

The near-eye display device includes a wearing frame having two viewing window regions spaced apart from each other. The diffractive waveguide apparatus is arranged on each of at least one of the two viewing window regions.

The near-eye display device includes a wearing holder, an image source, and an optical lens component. The wearing holder is connected to the wearing frame, the image source is arranged on a side of the waveguide substrate and configured to generate a light based on an image to be display, and the optical lens component is arranged between the image source and the output coupled grating of the diffractive waveguide apparatus, and is configured to guide the light into the input coupled grating according to a predetermined manner. At least one of the image source and the optical lens component is arranged at a connection of the wearing frame and the wearing holder.

A manufacturing method for a diffractive waveguide apparatus is provided by the present disclosure and includes providing a waveguide substrate; and forming a grating structure on a surface of the waveguide substrate. The grating structure includes multiple grating units, the multiple grating units have a first period in a first direction and a second period in a second direction, the second direction is different from the first direction, the first period and the second period are adjustable to cause a two-dimensional pupil expansion angle of the grating structure to be 180°.

At operation S2, the grating structure is formed on the surface of the waveguide substrate by one of nanoimprinting, casting, molding, and injection molding.

The technical solution in embodiments of the present disclosure are clearly and completely described in conjunction with the drawings in the embodiments of the present disclosure. It is obvious that the described embodiments are only some embodiments of the present disclosure, and not all the embodiments. All other embodiments acquired by those skilled in the art based on the embodiments in the present disclosure without the creative work are all within the scope of the present disclosure.

In addition, following description of some embodiments refer to the drawings to illustrate specific implementations that may be implemented in the present disclosure. Directional terms mentioned in the present disclosure, such as "above" "upper", "lower", "down", "front", "rear", "left", "right", "inside", "outside", and "side", etc., are only for reference to the direction of the drawings. Therefore, the directional terms are for better and clearer explaining and understanding of the present disclosure, rather than indicating or implying that the referred device or component must have a specific orientation, be constructed and operated in a specific orientation. Therefore, the directional terms cannot be understood as a limitation of the present disclosure.

In the description of the present disclosure, it should be noted that unless specified and limited, terms "install", "joint", "connection", and "arranged . . . on . . . " should be broadly understood. For example, they may be fixed connections, detachable connections, integrated connections, mechanical connection, direct connection, indirect connection through an intermediate medium, or internal connection between two components. For those skilled in the art, the specific meanings of the above terms in the present disclosure may be understood in specific circumstances.

Figure 2:
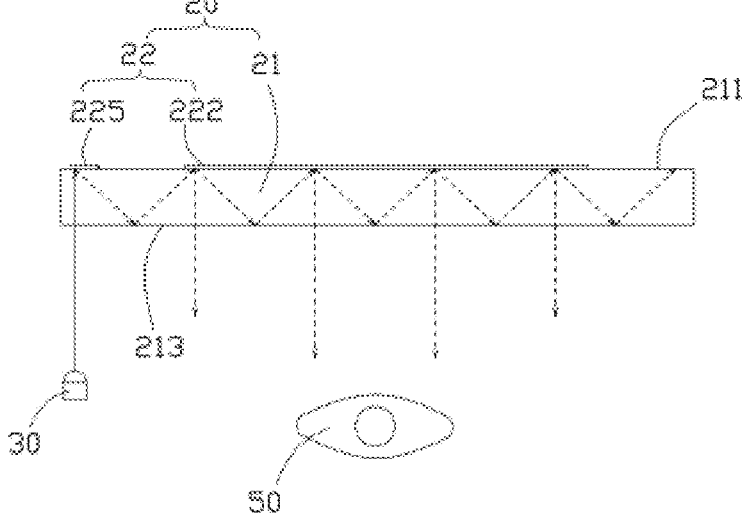
FIG. 2 is a schematic diagram of a usage state of a diffractive waveguide apparatus according to a first embodiment of the present disclosure.
Figure 3:
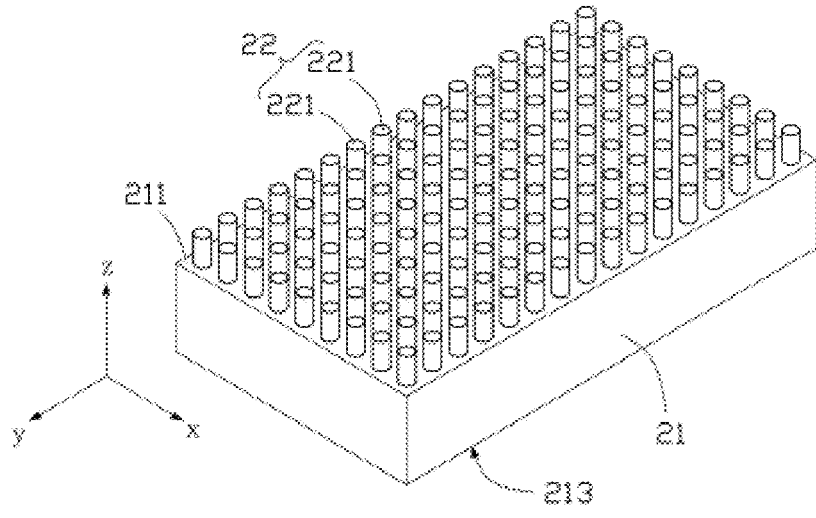
FIG. 3 is a structural schematic diagram of a portion of a grating structure and a waveguide substrate of the diffractive waveguide apparatus shown in FIG. 2.
Figure 4:
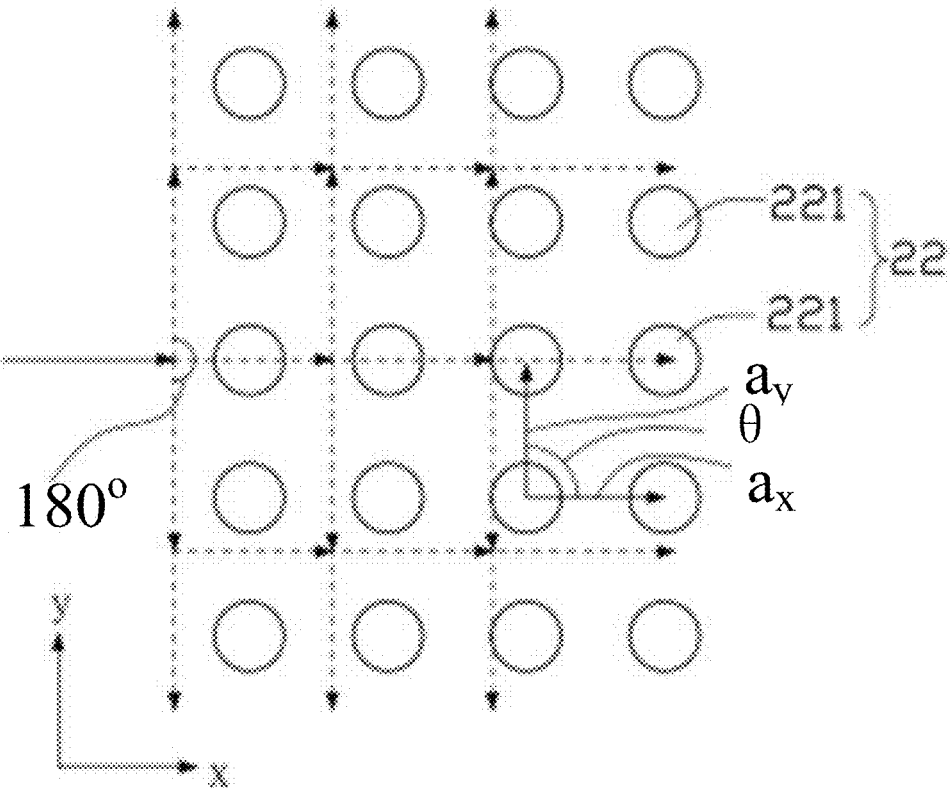
FIG. 4 is a schematic diagram of a pupil expansion for a light performed by the grating structure shown in FIG. 3.
Figure 5:
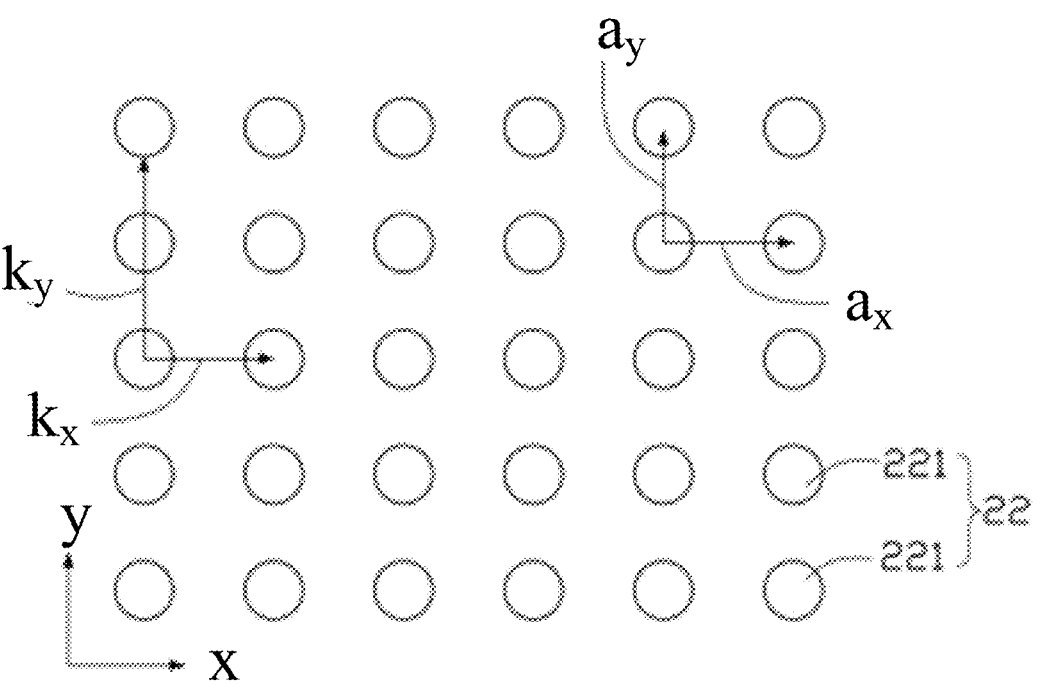
FIG. 5 is a front schematic diagram of the grating structure shown in FIG. 3.

As shown FIG. 2 to 5, FIG. 2 is a schematic diagram of a usage state of a diffractive waveguide apparatus 20 according to a first embodiment of the present disclosure, FIG. 3 is a structural schematic diagram of a portion of a grating structure 22 and a waveguide substrate 21 of the diffractive waveguide apparatus 20 shown in FIG. 2, FIG. 4 is a schematic diagram of a pupil expansion for a light performed by the grating structure 22 shown in FIG. 3, and FIG. 5 is a front schematic diagram of the grating structure shown in FIG. 3. Some embodiments of the present disclosure provide the diffractive waveguide apparatus 20 applied to AR glasses or a device with a windshield such as an automobile. The diffractive waveguide apparatus 20 is introduced in detail below. The diffractive waveguide apparatus 20 includes a waveguide substrate 21 and a grating structure 22. The grating structure 22 is arranged on a surface of the waveguide substrate 21. The grating structure 22 includes multiple grating units 221 having a first period in a first direction and a second period in a second direction different from the first direction. A two-dimensional pupil expansion angle of the grating structure 22 is caused to be 180° by adjusting the first period and the second period. In the present disclosure, the first period may include the first direction and a first mode length extending along the first direction, and the second period includes the second direction and a second mode length extending along the second direction. The two-dimensional pupil expansion angle of the grating structure 22 may be caused to be 180° by adjusting a pointing orientation of the first direction and the first mode length of the grating structure 22 and adjusting a pointing orientation of the second direction and the second mode length of the grating structure 22.

the multiple grating units 221 may be arrayed to form an output coupled grating 222 and/or an input coupled grating 225. The input coupled grating 225 is configured to couple a light in the waveguide substrate 21. The output coupled grating 222 is configured to receive a light totally reflected by the waveguide substrate 21, perform a two-dimensional pupil expansion on the light, and couple the light out of the waveguide substrate 21.

In FIG. 4, the light is represented by broken lines. When the diffractive waveguide apparatus 20 is used, it may be considered that the waveguide substrate 21 is located in a x-y plane, and each grating unit 221 extends along a Z-axis.

When the diffractive waveguide apparatus 20 is used, a light generated by an image source 30 for displaying an image enters the waveguide substrate 21 through the input coupled grating 225; after being totally reflected by the waveguide substrate 21, the light is emitted to the output coupled grating 222, and then is coupled out through the output coupled grating 222 and emitted to a human eye 50. Compared to a pupil expansion angle of the two-dimensional grating in the related art being 120°, the two-dimensional pupil expansion angle of the grating structure 22 is 180°, and a valid coupled grating region of the grating structure 22 in the present disclosure may be substantially rectangular. Therefore, it is not necessary to configure only some of the grating units 221 in the grating structure to perform pupil expansion, that is, the multiple grating units 221 do not have invalid out coupled gratings, such that area of the grating units 221 of the grating structure 22 for valid coupling out is increased, thereby increasing a valid display area of the grating structure 22 and improving a utilization rate of the grating.

The image source 30 is a device for generating an original image, and the image source 30 may include, but is not limited to, a Micro-LED display screen or a projector, etc.

The waveguide substrate 21, also called a light waveguide substrate, a dielectric waveguide substrate, or a waveguide substrate sheet, is a medium in which a light is guided to propagate. The light waveguide substrate includes two types. One type of light waveguide substrate is an integrated light waveguide substrate including a planar (thin film) dielectric waveguide substrate and a strip dielectric waveguide substrate, which are both a part of an optoelectronic integrated device (or system), so they are called the integrated light waveguide substrate. The other type of light waveguide substrate is a cylindrical light waveguide substrate, commonly called an optical fiber. The waveguide substrate 21 is commonly a guiding structure including a light transparent medium (such as quartz glass) for transmitting a light (optical frequency electromagnetic wave). When propagated in the waveguide substrate 21, the light is totally reflected in the waveguide substrate 21, such that the light is confined to propagate within the waveguide substrate 21.

The total reflection refers to a process of light propagation without loss or leakage. The "total reflection" is needed to enable the light to be reflected back and forth in a wave shape in the waveguide substrate without transmissivity. The total reflection can be realized with two required conditions: (1) a propagation medium, i.e., the waveguide substrate, is required to have a higher refractive index than a surrounding medium; (2) an incident angle of a light entering the waveguide substrate is required to be greater than a critical angle.

As shown in FIGS. 2 and 3, the waveguide substrate 21 includes a first surface 211 and a second surface 213 arranged opposite to each other. The first surface 211 is a surface away from the human eye 50 when the diffractive waveguide apparatus 20 is used. The second surface 213 is a surface close to the human eye 50 when the diffractive waveguide apparatus 20 is used. In some embodiments, the grating units 221 are protrusion structures protruding from a surface of the waveguide substrate 21, that is, the grating units 221 protrudes from the first surface 211 of the waveguide substrate 21. In some embodiments, the grating units 221 are cylindrical structures, and axes of the grating units 221 are perpendicular to the x-y plane, that is, the grating units 221 extend along the Z-axis. Cross sections, parallel to the x-y plane, of the grating units 221 are each circular in shape. The first surface 211 is a plane parallel to the x-y plane. The grating units 221 are arrayed on the first surface 211 to form a rectangle by being arranged along the first direction (i.e., x-axis direction) at interval of the first mode length and being arranged along the second direction (i.e., y-axis direction) at interval of the second mode length. A height of each grating unit 221 is same, that is, a length of each grating unit 221 along the Z-axis is same. Therefore, end surfaces of the grating units 221 away from the first surface 211 are coplanar.

The input coupled grating 225 is carried on the waveguide substrate 21, which includes following situations: the input coupled grating 225 being arranged on the first surface 211 of the waveguide substrate 21, or the input coupled grating 225 being arranged on the second surface 213 of the waveguide substrate 21. In the embodiments, the input coupled grating 225 is arranged on the first surface 211 of the waveguide substrate 21 as an example. The process of coupling a light in the waveguide substrate 21 through the input coupled grating 225 is also called a light couple-in. The output coupled grating 222 and the input coupled grating 225 are both diffractive gratings, and a diffractive grating is an optical element with a periodic structure. The periodic structure may be peaks and valleys embossed on the surface of the material, or "light-dark interference fringes" formed by exposure in the material through a holographic technology. The diffractive grating in the embodiments of the present disclosure is a protrusion structure protruding from the surface of the waveguide substrate 21 as an example. In a word, the diffractive grating causes a periodic change of the refractive index in the material. The period is generally at a micro-nano level, which is same as that of the visible light wavelength (~450 nm-700 nm), so as to validly control the light.

Figure 6:
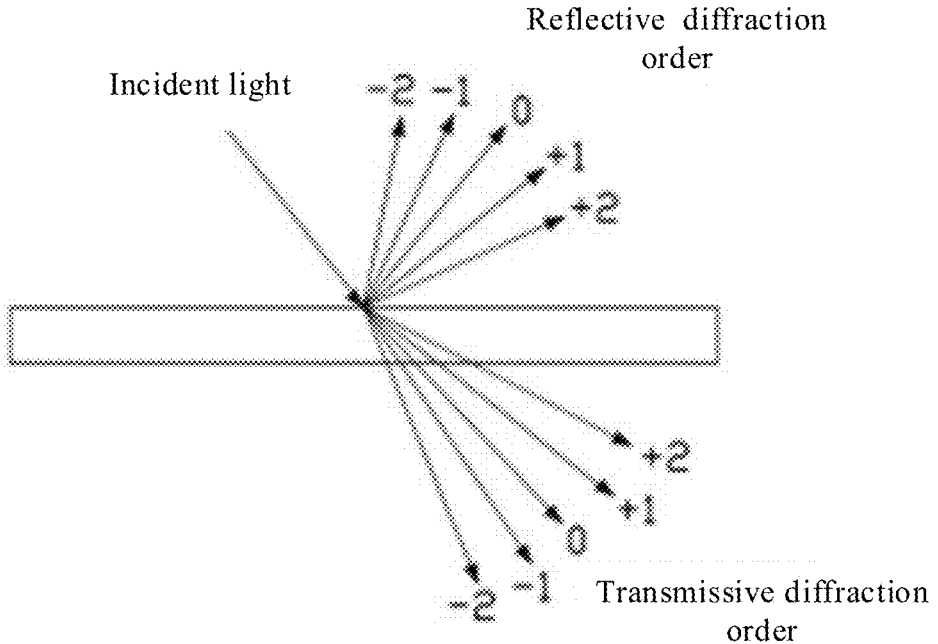
FIG. 6 is a schematic diagram of a light propagation in a diffractive grating.

As shown FIG. 6, FIG. 6 is a schematic diagram of a light propagation in a diffractive grating. A "splitting light" of the diffractive grating is embodied in two dimensions. When an incident light is a green light with a single wavelength, the incident light will be split into several diffraction orders by the diffractive grating. Each diffraction order will continue to propagate in different directions, and includes reflective diffraction light and transmissive diffraction light. The reflective diffraction includes diffraction orders such as 0 order, ±1 order, ±2 order . . . , and other diffraction orders. The transmissive diffraction includes diffraction orders such as 0 order, ±1 order, ±2 order . . . , and other diffraction orders. A diffraction angle corresponding each diffraction order is determined by the incident angle of the light and the period of the grating. Therefore, by designing other parameters of the grating, such as a material refractive index, a grating shape, a thickness, or a duty cycle, etc., a diffraction efficiency of a certain diffraction order (i.e., a certain direction) may be optimized to the highest, such that most portion of the light propagates in the certain direction after diffraction.

The pupil expansion is explained as follow. When a light is propagated in the waveguide substrate 21 and reaches the grating structure 22, a portion of the light is coupled out of the waveguide substrate 21 through diffraction, the rest portion of the light is diffracted again by the grating structure 22 and continues to be totally reflected and propagated in the waveguide substrate 21. The above process carries out repeatedly, such that there is light coupled out of the entire grating structure 22. Therefore, the human eye 50 may see complete and continuous images at any position.

The AR is explained as follow. A light generated by the image source 30 in the near-eye display device for displaying an image enters the waveguide substrate through the input coupled grating, and then is coupled out of the output coupled grating and emitted into the human eye. An external environmental light (such as an outdoor sunlight and a light generated by an indoor lighting) may also penetrate the input coupled grating and be emitted into the human eye. Therefore, a user may observe the images from the image source and from the external environment, thereby implementing an AR function of combining virtuality and reality.

As shown in FIG. 2, the image source 30 may be a Lambert light source, and the light emitted by the image source 30 is emitted to an ideal lens (not shown). The ideal lens collimates the incident light and emits it into the input coupled grating 225. After diffraction by the input coupled grating 225, the light is propagated to in the waveguide substrate 21 in a form of total reflection and reaches the output coupled grating 222, the output coupled grating 222 couples the total reflected light out to the air through diffraction, and then the light enters the human eye 50, enabling the human eye 50 to see the virtual image. In combination with the fact that the input coupled grating 225 may be permeable to environmental light, an effect of AR is thus implemented. When there is a difference in the incidence angle of a light entering the input coupled grating 225, it is reflected in the field of view of a diffractive waveguide apparatus. That is, the greater the field of view designed for the diffractive waveguide apparatus, the greater the incident angle of light entering the input coupled grating 225. For the input coupled grating 225, the greater the field of view of the diffractive waveguide apparatus, the greater the incident angle of the output coupled grating 222, and the greater an angle of a coupled light. Therefore, in a design process of diffractive waveguide apparatus 20, the period and shape of the output coupled grating 222 are controlled to be consistent with those of the input coupled grating 225, except that there is a difference in heights of the grating units 221 (i.e., lengths of the grating units extending along the Z-axis). The input coupled grating 225 and the output coupled grating 222 may be considered to be a conjugate system, and there is only a difference in diffraction efficiency therebetween.

Figure 7:
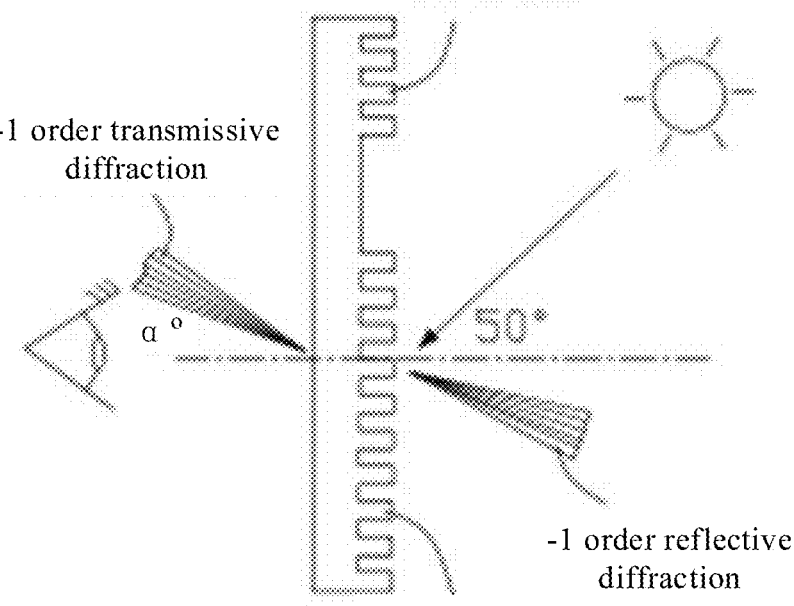
FIG. 7 is a schematic diagram of a rainbow pattern corresponding to an incidence angle of sunlight to the diffractive grating.
Figure 8:
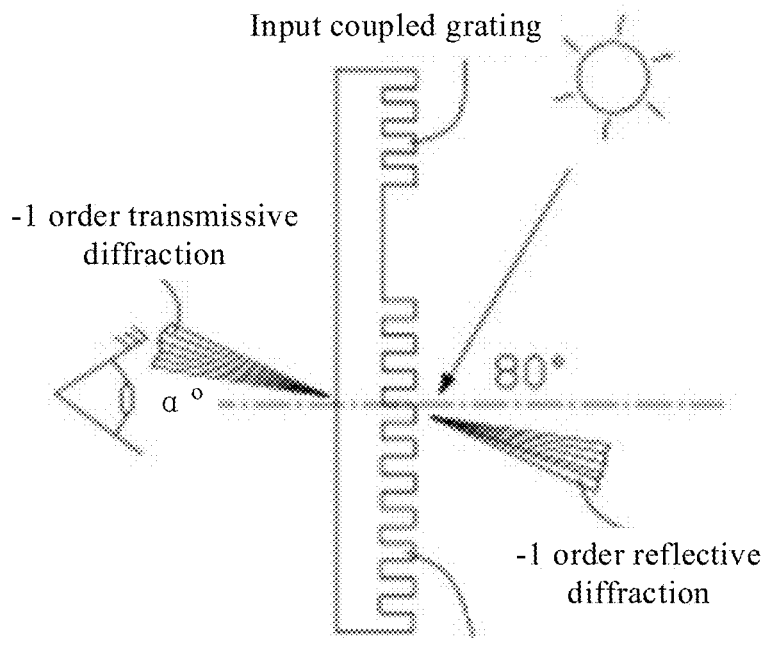
FIG. 8 is a schematic diagram of a rainbow pattern corresponding to another incidence angle of sunlight to the diffractive grating.

A conventional diffractive waveguide apparatus includes an input coupled grating and an output coupled grating to implement the two-dimensional pupil expansion. The image source enters the waveguide substrate through the input coupled grating, and then is emitted into the human eye through the output coupled grating. An external environmental light may also be emitted into the human eye through the input coupled grating, thereby implementing the AR function of combining virtuality and reality. Due to a strong dispersion function of both the input coupled grating and the output coupled grating, when a strong external environmental light (such as a sunlight or a lighting source) is incident, the incident light of the external environmental light will be dispersed into a rainbow pattern by the diffractive grating, which is generated mainly through a −1 order reflective diffraction and a −1 order transmissive diffraction. As shown in FIGS. 7 and 8, the light of the −1 order reflective diffraction cannot enter the human eye, without impact on the user's experience. However, the light of the −1 order transmissive diffraction may enter the human eye, and enables people to see the rainbow pattern, thereby reducing the user's experience, or even harming the human eye. It should be noted that whether the rainbow pattern formed by the −1 order transmissive diffraction may be emitted into the human eye of the user wearing the diffractive waveguide apparatus 20 is related to the incident angle of the external environmental light. When the external environmental light enters the output coupled grating at 50°, the rainbow pattern formed by the −1 order transmissive diffraction has a large emitting angle of a°, and the diffraction light is easy to deviate from an observation position of the human eye. Even if the diffraction light enters the human eye, the rainbow pattern will still appear in the periphery of the field of view due to the large diffraction angle of a°. When the external environmental light enters the output coupled grating at 80°, the −1 order transmissive diffraction has a small emitting angle of a°, the diffraction light is easy to enter the human eye, and the rainbow pattern will appear in a center of the field of view, which has a significant impact on the user.

As shown in FIG. 4, the diffractive waveguide apparatus 20 in the present disclosure is adopted with the grating structure 22 for two-dimensional pupil expansion, and the two-dimensional pupil expansion angle is 180°, which is different from the pupil expansion angle of 120° of the two-dimensional grating in the diffractive waveguide system of FIG. 1. In this way, a valid coupled area of the grating structure 22 is increased, thereby increasing a valid display area of the grating structure 22 and improving a utilization rate of the grating. In some embodiments, a primitive vector angle θ of the grating structure 22 is 90°, that is, the grating structure 22 has a first primitive vector $a_x$ and a second primitive vector $a_y$, and the angle θ between the first vector $a_x$ and the second primitive vector $a_y$ is 90°. The first primitive vector $a_x$ and the second primitive vectors $a_y$ respectively represent the first direction and the second direction of the multiple grating units 221. In FIG. 4, the first direction of a is parallel to the x-axis direction, and the second direction of a is parallel to the y-axis direction. The grating structure 22 is adopted with the square or rectangular lattice with the primitive vector angle θ of 90° to implement pupil expansion. In a general process of square or rectangular lattice diffraction, the 1 order diffraction and −1 order diffraction play a dominated role, thereby decreasing an efficiency of a vertical pupil expansion and reducing the valid output coupled region of the grating. Therefore, in the present disclosure, parameters of the square or rectangular lattice may be designed to shield the 1 order diffraction and −1 order diffraction, thereby improving the efficiency of the vertical pupil expansion and increasing the valid area of the grating structure.

As shown in FIG. 5, the technical principle is analyzed by taking the grating units 221 of the grating structure 22 being arrayed into the rectangular lattice as an example, and the square lattice is only a special case where the period in the first direction (i.e., first mode length) and the period in the second direction (i.e., second mode length) of the rectangular lattice are equal. The grating units 221 arrayed into the rectangular lattice have a first primitive vector $a_x$ and a second primitive vector $a_y$, and $a_x \perp a_y$. When the periods are equal (that is, the first mode length is equal to the second mode length), that is, when $a_x = a_y$, the grating units 221 are arrayed into the square lattice. The grating units 221 arrayed into the rectangular lattice have reciprocal lattice vectors $k_x = 2\pi\theta_x/|a_x|$, $k_y = 2\pi\theta_y/|a_y|$, and the diffraction order of the grating units 221 is a linear superposition based on these two vectors. $a_x$ is the period of the grating structure 22 in the x-direction (i.e., first mode length), and $a_y$ is the period of the grating structure 22 in the y direction (i.e., second mode length). In a reciprocal space, $k_x$ is the grating vector in the x-direction, and $k_y$ is the grating vector in the y direction.

Figure 9:
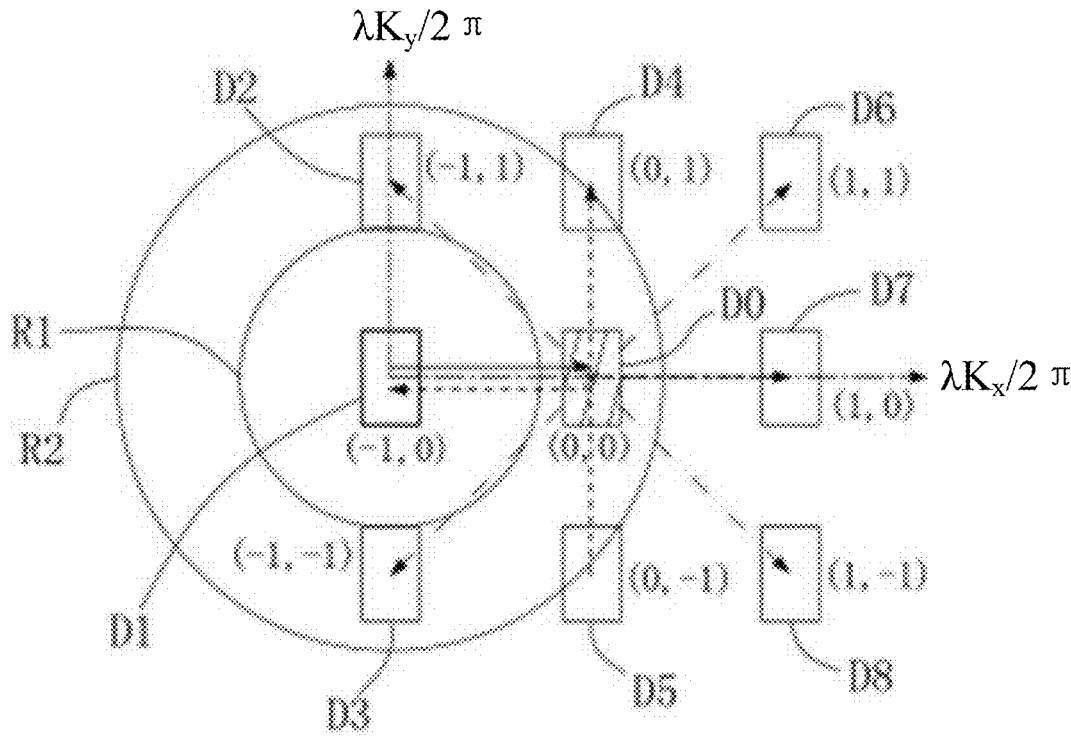
FIG. 9 is a schematic diagram of a K-space analysis diffraction of a grating structure according to some embodiments of the present disclosure.

In the diffractive waveguide apparatus 20, −1 order diffraction, 0 order diffraction, or +1 order diffraction along the x-direction combined with −1 order diffraction, 0 order diffraction, or +1 order diffraction along the y direction is taken as a diffraction order, where (0,0) order is 0 order diffraction. As shown in FIG. 9, FIG. 9 is a schematic diagram of a K-space analysis diffraction of a grating structure according to some embodiments of the present disclosure, where a horizontal axis is $\lambda k_x/2\pi$, and a vertical axis is $\lambda k_y/2\pi$. A radius of a concentric inner circle R1 in FIG. 9 is an environmental refractive index, a radius of a concentric outer circle R2 in FIG. 9 is a refractive index of a waveguide substrate, and a rectangle represents the field of view. λ is a wavelength, $k_x$ is the grating vector along the x-direction in the reciprocal space, $k_y$ is the grating vector along the y direction in the reciprocal space, and k multiplying by the vector $\lambda/2\pi$ is for normalizing a unit. FIG. 9 illustrates 9 fields of view D0-D8, DO has (0,0) order diffraction (i.e., 0 order diffraction), D1 has (−1,0) order diffraction (i.e., center field of view), D2 has (−1,1) order diffraction, D3 has (−1,1) order diffraction, D4 has (0,1) order diffraction, D5 has (0,1) order diffraction, D6 has (1,1) order diffraction, D7 has (1,0) order diffraction, and D8 has (1,1) order diffraction. The field of view being located in the inner circle R1 indicates couple-out waveguide. The field of view being located in a ring formed between the inner circle R1 and the outer circle R2 indicates that the light may be propagated in the waveguide substrate 21. The field of view being located outside the outer circle R2 indicates that the light does not exist. The field of view outside the outer circle R2 is shown here only to illustrate the diffraction order.

The center field of view D1 (with (−1, 0) order diffraction) is coupled in the waveguide substrate 21 through the input coupled grating, i.e., the filled rectangle (i.e., DO) in FIG. 9. The field of view coupled in the waveguide may be diffracted to the diffraction fields of view D1-D8 through the output coupled grating 222. Without considering the presence of the light, the nine rectangular regions (i.e., nine fields of view) in FIG. 9 are analyzed. The filled rectangular region (i.e., field of view DO) represents (0,0) order diffraction (i.e., field of view DO), and a coordinate origin region (i.e., field of view D1) represents the couple-output waveguide. In other diffraction fields of view (i.e., fields of view D2-D8), it can be seen that the three rightmost fields of view (i.e., fields of view D6-D8) cannot exist at all, and there is no need to describe them. The diffraction orders of the remaining four fields of view (i.e., fields of view D2-D5) are (0, ±1) order diffraction and (−1, ±1) order diffraction, respectively. In FIG. 9, parts of the fields of view with (0, ±1) order diffraction (i.e., fields of view D4-D5) are propagated in the waveguide substrate 21, while the other parts do not exist. However, when the fields of view (i.e., fields of view D4-D5) with (0, ±1) diffraction orders in the FIG. 9 are coupled out again through the grating diffraction, brightness of the field of view is extremely uneven. In addition, the presence of (0, ±1) diffraction orders greatly reduce a diffraction efficiency of (−1, ±1) order diffraction, thereby reducing the valid grating region.

Figure 10:
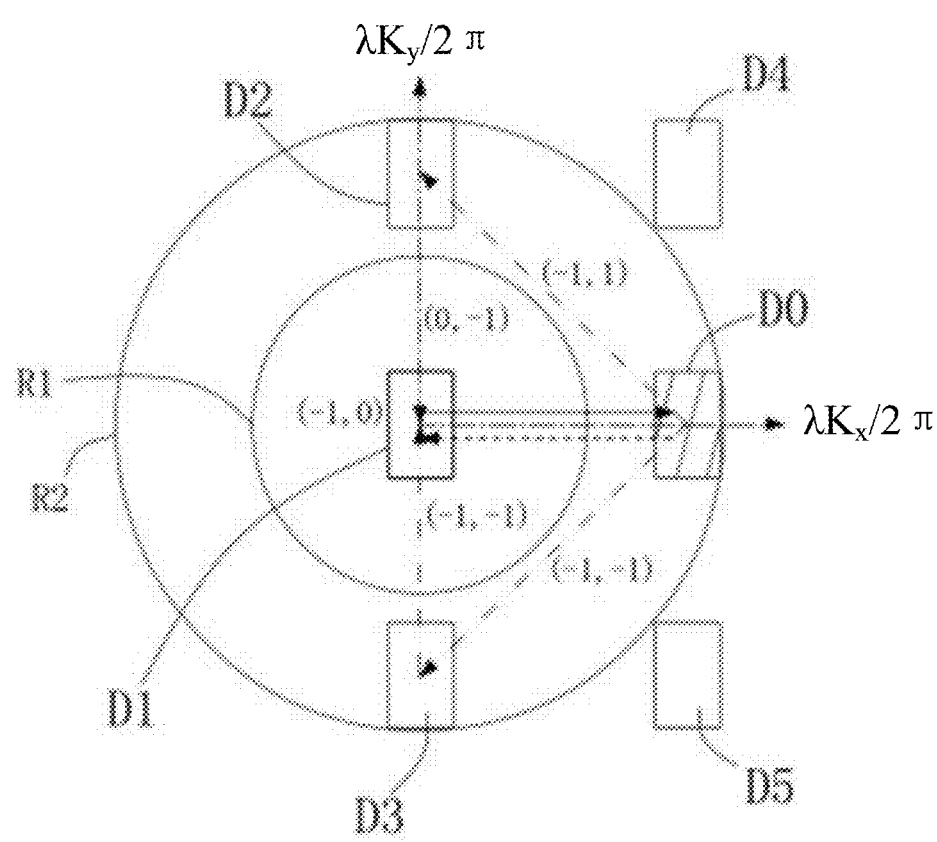
FIG. 10 is a schematic diagram of a K-space analysis diffraction of a grating structure according to some embodiments of the present disclosure.

Based on the above analysis, the diffraction of (0, ±1) diffraction order may be avoided by designing a size of the period of the grating structure 22 and a ratio of length to width of the rectangular lattice. specifically, the first period in the first direction (i.e., first mode length) and the second period (i.e., second mode length) in the second direction of the multiple grating units 221 of the grating structure 22 are designed, and the ratio of length to width of the rectangular lattice formed by the multiple grating units 221 of the grating structure 22 is adjusted, such that the diffraction fields of view with (0, ±1) diffraction order are compressed outside the outer circle R2 (as shown in FIG. 10). In some embodiments, the first mode length of the first period is 260 nm to 500 nm, the second mode length of the second period is 260 nm to 500 nm, and the ratio of length to width of the rectangular lattice is 0.5-2.

As shown in FIG. 10, FIG. 10 is a schematic diagram of a K-space analysis diffraction of a grating structure 22 according to some embodiments of the present disclosure. By designing the direction and length of the period of the grating structure 22, the center field of view D1 is located in the inner circle R1, the field of view DO with (0,0) order diffraction, the field of view D2 with (−1,+1) order diffraction, and the field of view D3 with (−1,−1) order diffraction are both located in the ring formed between the inner circle R1 and the outer circle R2, and the field of view D4 with (0,+1) order diffraction and the field of view D5 with (0, −1) order diffraction are both located outside the outer circle R2 to avoid (0,±1) order diffraction. In this way, the grating structure 22 may improve the pupil expansion efficiency while ensuring the valid grating region. From FIG. 10, it may be seen that the field of view coupled in the waveguide has three paths to be coupled out of the waveguide. The first path is that the field of view is coupled out of the waveguide through the (−1, 0) order diffraction, the second path is that the field of view is subjected to an orthogonal pupil expansion on a side through (−1,−1) order diffraction and then coupled out of the waveguide through the (0,−1) order diffraction, and the third path is that the field of view is subjected to an orthogonal pupil expansion on the other side through the (−1,+1) order diffraction and then coupled out of the waveguide through (0,+1) order diffraction. Due to the suppression of (0, ±1) order diffraction of the grating structure 22, besides (0, 0) order diffraction, the light only has (−1, ±1) order diffraction. Therefore, for the light in the center field of view D1, projections of the two diffractions on the horizontal plane (i.e., x-y plane) are perpendicular to the input-coupled propagation light, thereby implementing orthogonal pupil expansion of 90° to form a pupil expansion region of 180°.

Figure 11:
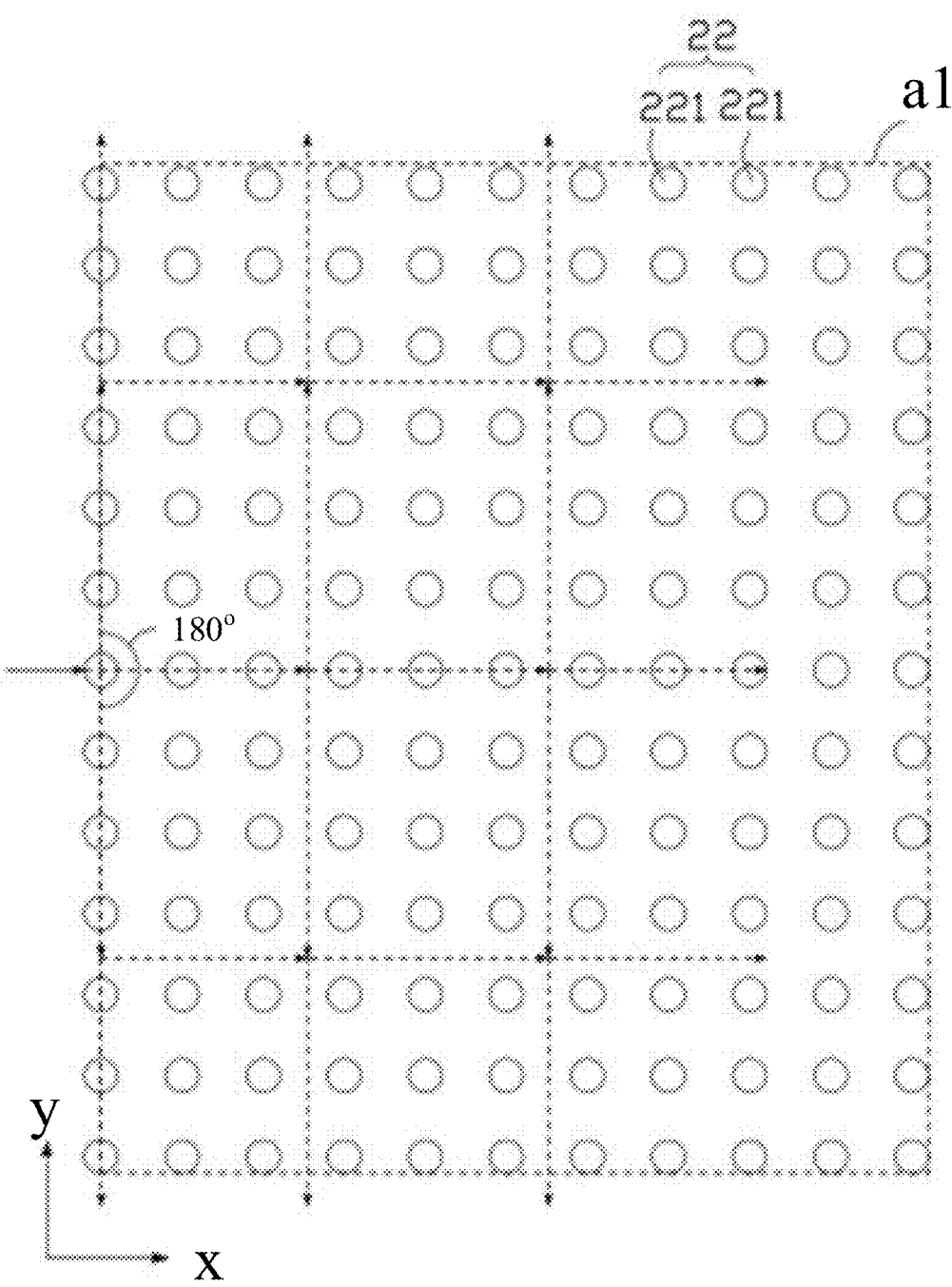
FIG. 11 is a schematic diagram of a pupil expansion for a light performed by a grating structure shown in FIG. 3.

As shown in FIG. 11, FIG. 11 is a schematic diagram of a pupil expansion for a light performed by a grating structure shown in FIG. 3. When the light reaches the grating structure 22, the grating units 221 implement the orthogonal pupil expansion of 90° to form the pupil expansion region of 180°, such that an output coupled grating region ai of the grating structure 22 is in a shape of a rectangle. Therefore, a valid output coupled grating region of the grating structure 22 increases, thereby increasing a valid display area of the grating structure 22 and improving a utilization rate of the grating.

In other embodiments, the angle between the first direction of the first period of the grating structure and the second direction of the second period of the grating structure is 90°, and the first mode length of the first period is different from the second mode length of the second period, such that the ratio of length to width of the grating structure is 0.5-2, that is, the grating structure is in a shape of a rectangular lattice. Specifically, the mode length of the first period may be greater than or equal to N times the mode length of the second period, and a range of N is: 0.5≤N≤2. The grating structure is the same as the grating structure 22 in the first embodiment, that is, the output coupled grating region of the grating structure is in a shape of a rectangle, such that the grating structure may form a 180° pupil expansion region, thereby increasing the valid output coupled grating region, increasing the valid display area of the grating structure, and improving the utilization rate of the grating.

Figure 12:
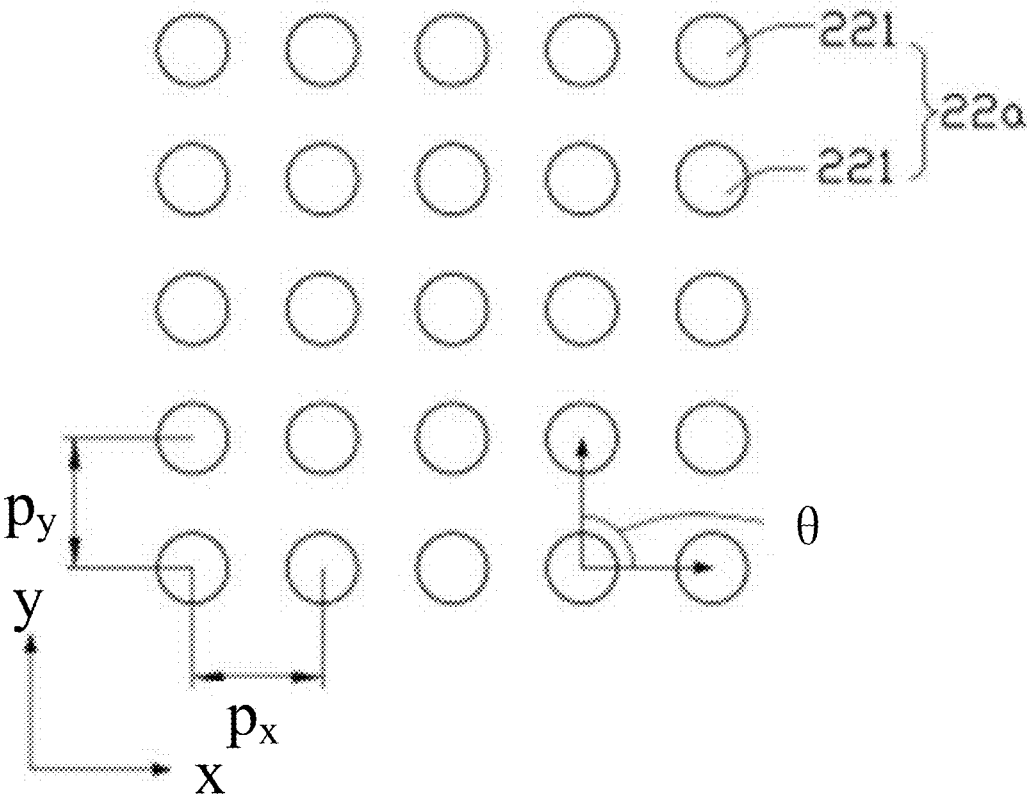
FIG. 12 is a schematic diagram of a grating structure according to a second embodiment of the present disclosure.
Figure 13:
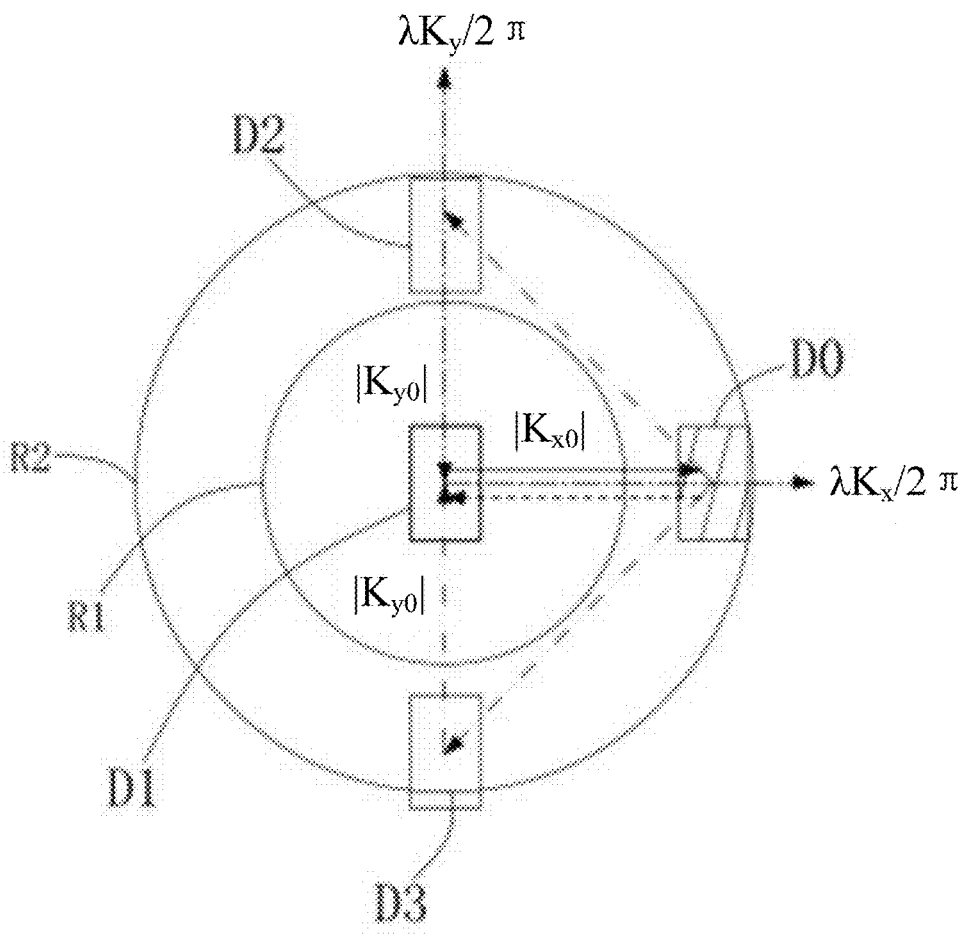
FIG. 13 is a schematic diagram of a K-space analysis diffraction of a grating structure shown in FIG. 12.

As shown FIGS. 12 and 13, FIG. 12 is a schematic diagram of a grating structure 22a according to a second embodiment of the present disclosure, and FIG. 13 is a schematic diagram of a K-space analysis diffraction of a grating structure 22a shown in FIG. 12. The grating structure 22a provided in the second embodiment of the present disclosure is similar to the grating structure 22 of the first embodiment, except that sizes of the periods of the first and second primitive vectors of the grating structure 22a of the second embodiment are equal, that is, the grating units 221 of the grating structure 22a are arrayed into a square lattice. Specifically, a direction of the first primitive vector $p_x$ of the grating structure 22a is perpendicular to a direction of the second primitive vector $p_y$ of the grating structure 22a, and the size of the period of the first primitive vector (i.e., first mode length) is equal to the size of the period of the second primitive vector (i.e., second mode length), that is, $p_x = p_y$. The corresponding reciprocal lattice vectors are:

$$K_{x0} = \frac{2\pi}{p_x} e_x$$

$$K_{y0} = \frac{2\pi}{p_y} e_y$$

A relationship between reciprocal lattice vectors is $K_{x0} \perp K_{y0}$, $|K_{x0}| = |K_{y0}|$, where $p_x$ is a period (i.e., mode length) of the two-dimensional grating in the x-direction, $p_y$ is a period (i.e., mode length) of the two-dimensional grating in the y-direction, $K_{x0}$ is the x-direction grating vector in the reciprocal space, and $K_{y0}$ is a grating vector along y-direction in the reciprocal space. (0, ±1) order diffraction of the square lattice is suppressed, besides (0, 0) 0 order diffraction (i.e., the field of view DO), the light only has (−1, ±1) order diffraction (i.e., the fields of view D2 and D3). For the light in the center field of view D1, projections of the two diffractions on the horizontal plane are perpendicular to the input coupled propagation light, such that the grating structure 22a may implement the orthogonal pupil expansion of 90° to form a pupil expansion region of 180°. Therefore, the valid output coupled grating region of the grating structure 22a increases, thereby increasing the valid display area of the grating structure 22a, and improving the utilization rate of the grating; in addition, reducing unnecessary couple-out, and improving an overall efficiency of the diffractive waveguide apparatus.

Figure 14:
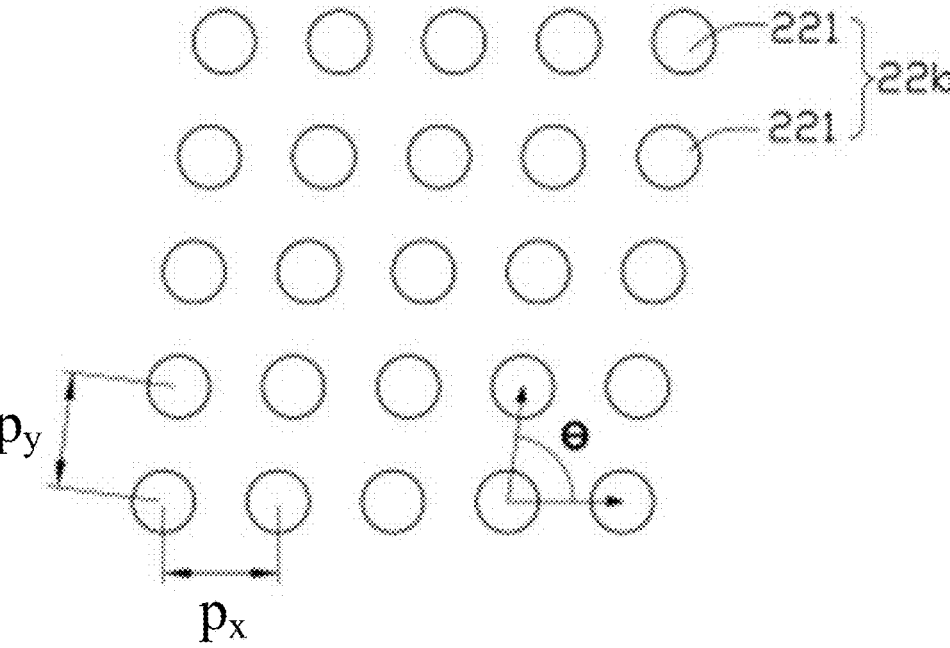
FIG. 14 is a schematic diagram of a grating structure according to a third embodiment of the present disclosure.
Figure 15:
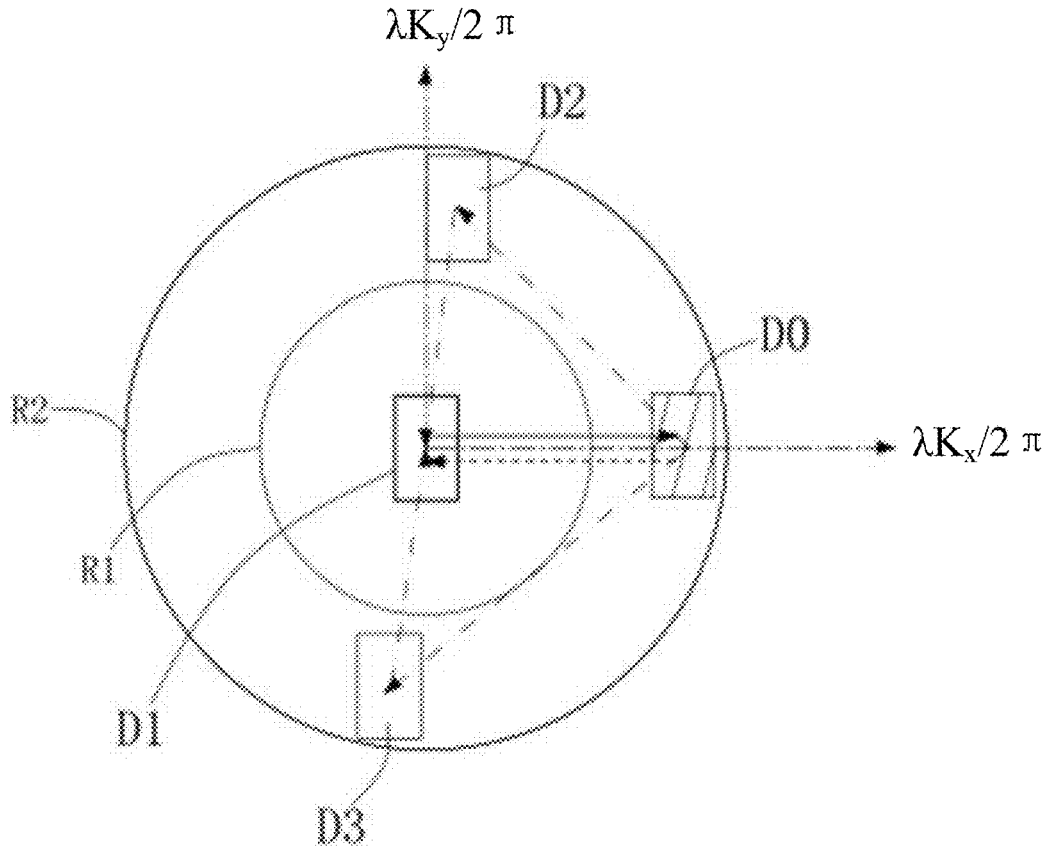
FIG. 15 is a schematic diagram of a K-space analysis diffraction of a grating structure shown in FIG. 14.
Figure 16:
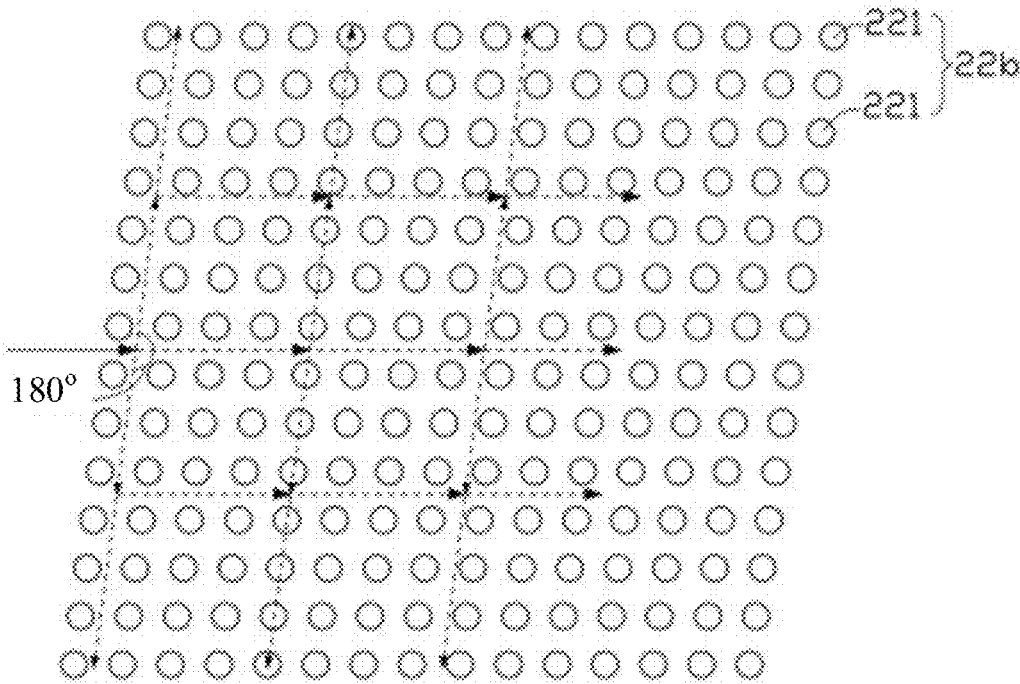
FIG. 16 is a schematic diagram of a pupil expansion for a light performed by a grating structure shown in FIG. 14.
Figure 17:
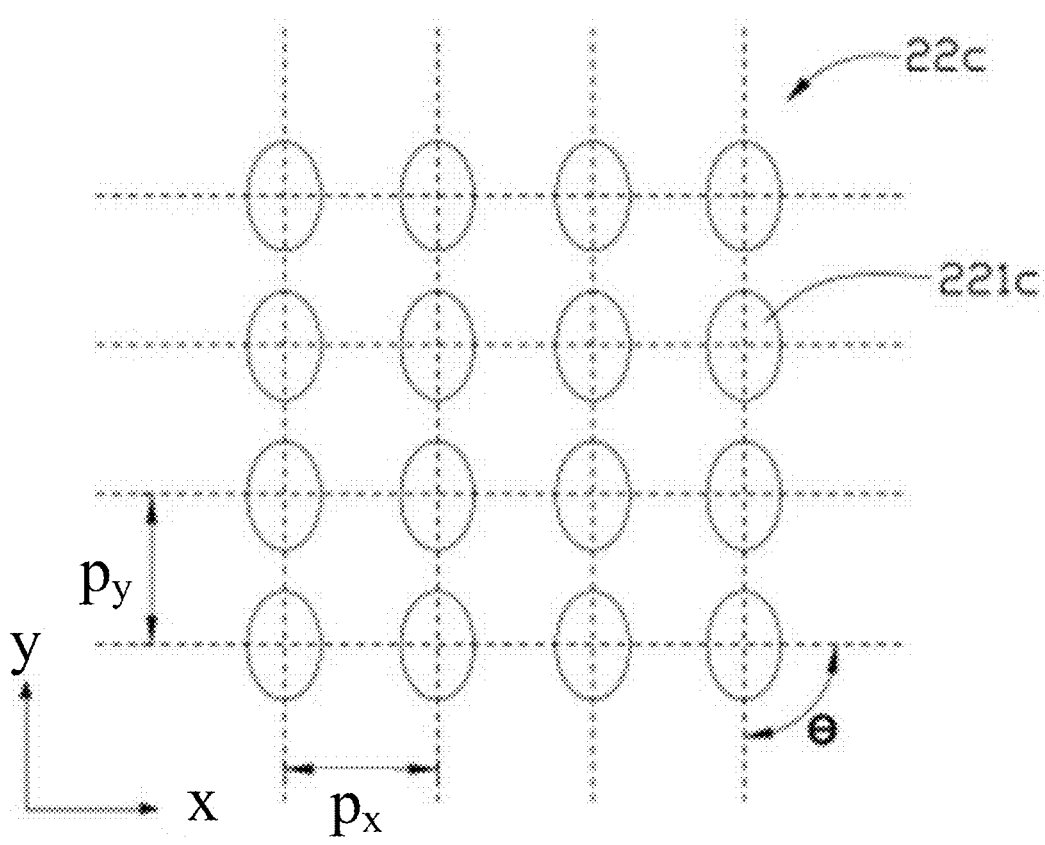
FIG. 17 is a schematic diagram of a grating structure according to a fourth embodiment of the present disclosure.
Figure 18:
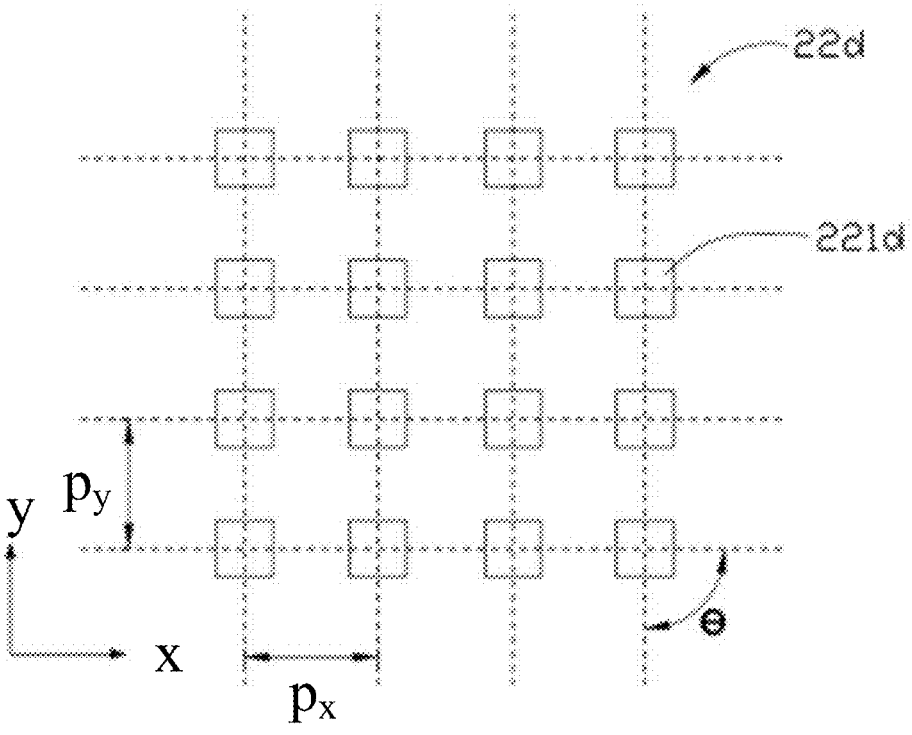
FIG. 18 is a schematic diagram of a grating structure according to a fifth embodiment of the present disclosure.
Figure 19:
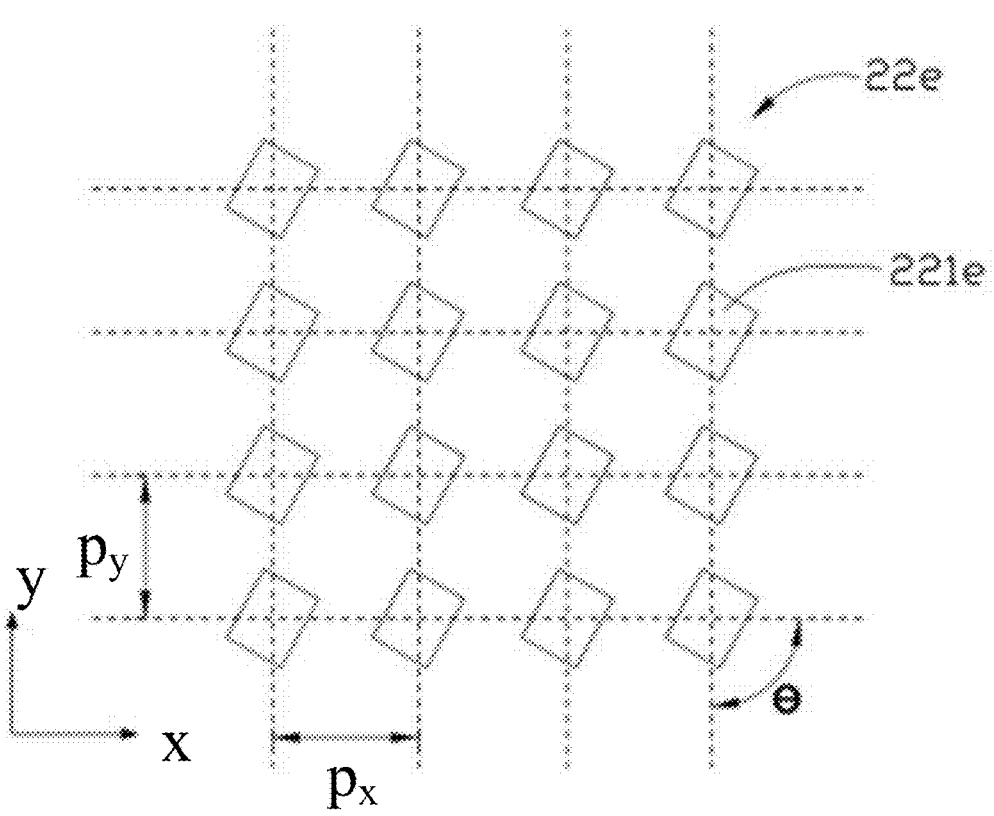
FIG. 19 is a schematic diagram of a grating structure according to a sixth embodiment of the present disclosure.
Figure 20:
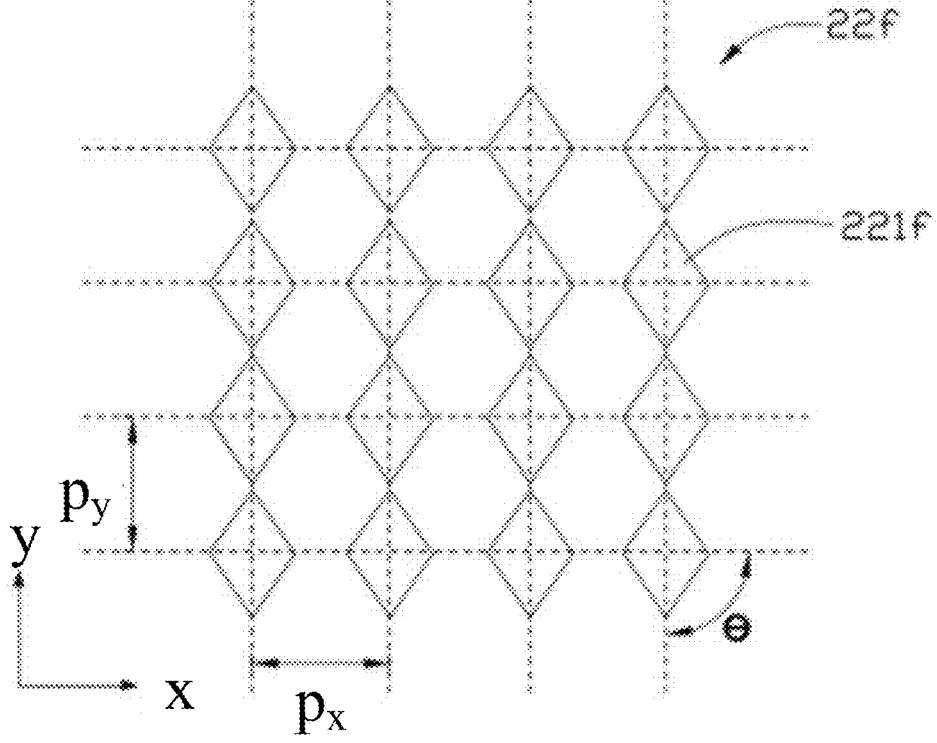
FIG. 20 is a schematic diagram of a grating structure according to a seventh embodiment of the present disclosure.
Figure 21:
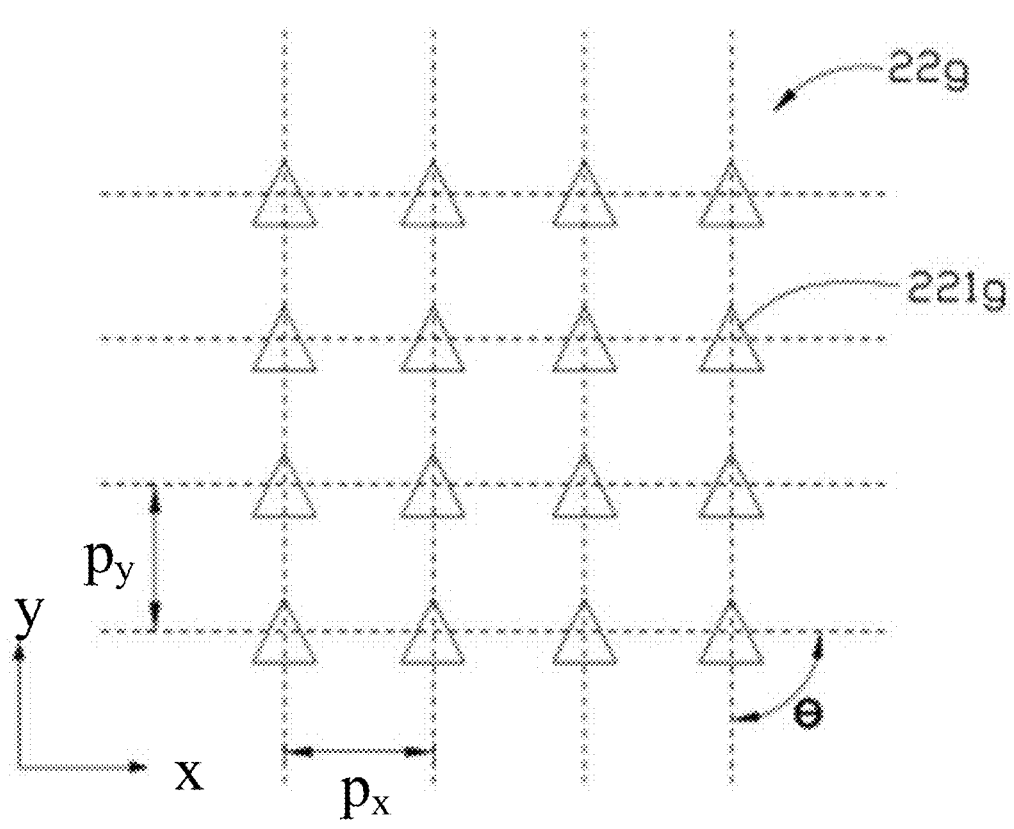
FIG. 21 is a schematic diagram of a grating structure according to an eighth embodiment of the present disclosure.
Figure 22:
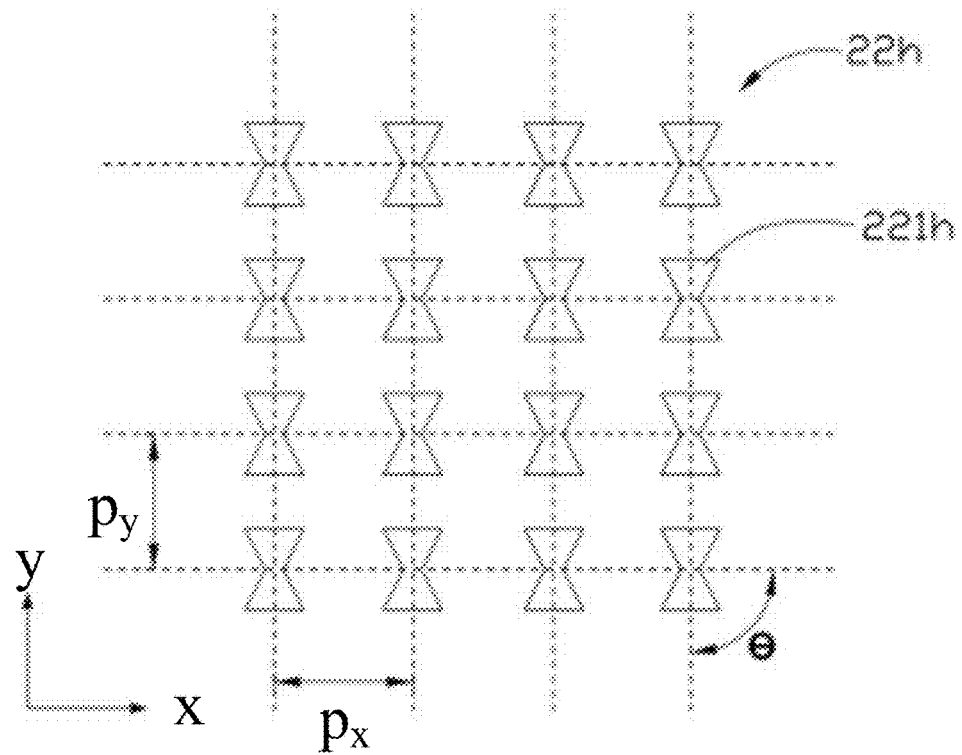
FIG. 22 is a schematic diagram of a grating structure according to a ninth embodiment of the present disclosure.
Figure 23:
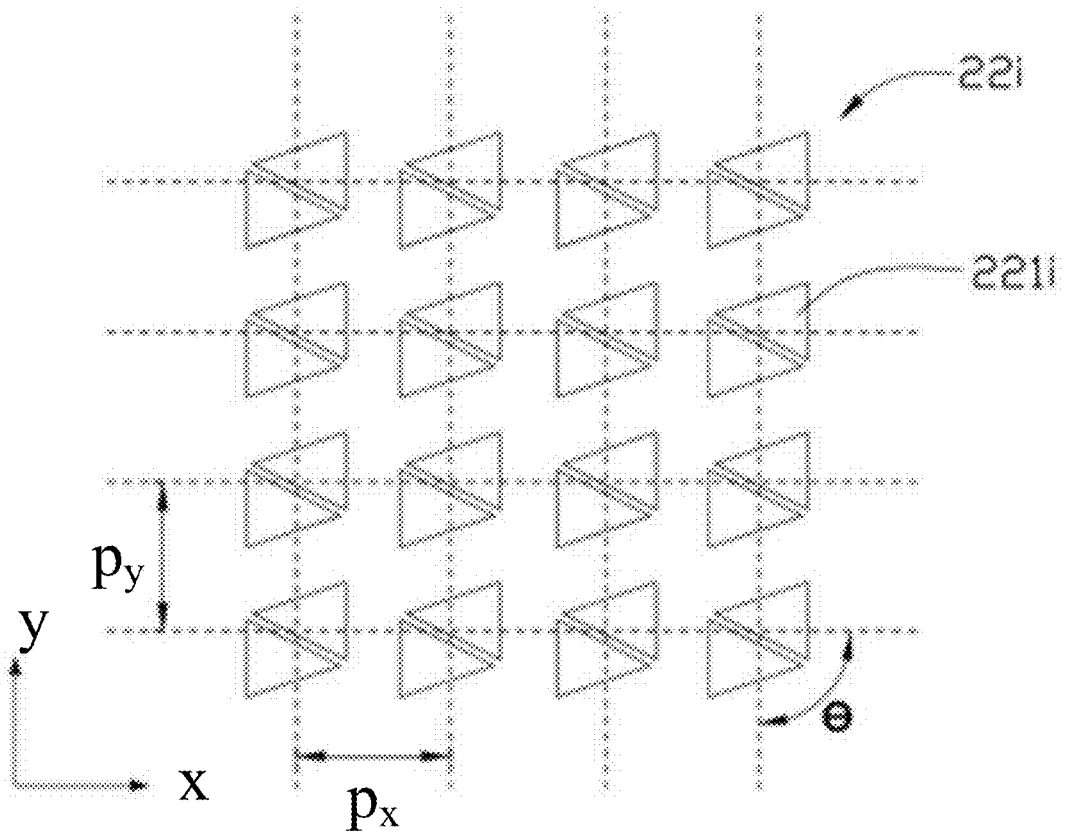
FIG. 23 is a schematic diagram of a grating structure according to a tenth embodiment of the present disclosure.

As shown FIG. 14 to 16, FIG. 14 is a schematic diagram of a grating structure 22b according to a third embodiment of the present disclosure, FIG. 15 is a schematic diagram of a K-space analysis diffraction of a grating structure 22b shown in FIG. 14, and FIG. 16 is a schematic diagram of a pupil expansion for a light performed by a grating structure 22b shown in FIG. 14. The grating structure 22b provided in the third embodiment of the present disclosure is similar to the grating structure 22 in the first embodiment, except that a range of the angle θ between the first and second primitive vectors of the grating structure 22b is: 80°≤θ≤100°, the size of the period (i.e., mode length) of the first primitive vector is not equal to the size of the period (i.e., mode length) of the second primitive vector, and the ratio of length to width is 0.5 and 2. That is, the range of the angle θ between the first and second directions of the grating structure 22b is: 80°≤θ≤100°, the size of the period (i.e., mode length) of the first primitive vector is equal to N times the size of the period (i.e., mode length) of the second primitive vector, and the range of N is: 0.5≤N≤2. In some embodiment, the angle θ is 80°, and N equals 1. The grating units 221 of the grating structure 22b are arrayed into an oblique lattice, which is acquired by deformation of the rectangular lattice formed by the grating structure 22 in the first embodiment. Therefore, the effect of implementing the two-dimensional pupil expansion of the grating structure 22b is similar to that of the grating structure 22 in the first embodiment, and the grating structure 22b may also implement a substantially same pupil expansion goal.

As shown in FIGS. 15 and 16, although the pupil expansion angle of the grating structure 22*b* in both directions vary with the angle θ between the first and second directions, the pupil expansion angle of the center field D1 remains 180°, resulting in a parallelogram (i.e., oblique lattice) of the output coupled grating region of the grating structure 22*b*, that is, the output coupled grating region of the grating structure 22*b* is similar to a rectangle. Therefore, the pupil expansion effect of the grating structure 22*b* is similar to that of the grating structure 22 in the first embodiment. Compared to the two-dimensional grating in the related art, the valid output coupled grating region of the grating structure 22*b* increases, thereby increasing the valid display area of the grating structure 22*b*, improving the utilization rate of the grating, and improving the overall efficiency of the diffractive waveguide apparatus.

As shown FIGS. 17 to 23, FIGS. 17 to 23 are schematic diagrams of grating structures according to a fourth to a tenth embodiments of the present disclosure. The grating structures provided by the fourth to tenth embodiments of the present disclosure are similar to the grating structure 22 of the first embodiment, except that the appearance of the grating unit 221*c* of the grating structure provided by the fourth to tenth embodiments is different from the appearance of the grating unit 221 in the first embodiment. In some embodiments, each grating unit 221*c* of a grating structure 22*c* in the fourth embodiment is in a shape of an elliptical cylindrical structure, an axis of the grating unit 221*c* is perpendicular to the x-y plane, and a cross section, parallel to the x-y plane, of the grating unit 221*c* is elliptical. Each grating unit 221*d* of a grating structure 22*d* in the fifth embodiment is in a shape of a square prism shaped structure, the square prism shaped structure is perpendicular to the x-y plane, and a cross section, parallel to the x-y plane, of the grating unit 221*d* is a square. Each grating unit 221*e* of a grating structure 22*e* in the sixth embodiment is in a shape of a rectangular prism shaped structure, the rectangular prism shaped structure is perpendicular to the x-y plane, and a cross section, parallel to the x-y plane, of the grating unit 221*e* is rectangular. Each grating unit 221*f* of a grating structure 22*f* in the seventh embodiment is in a shape of a prismatic structure, the prismatic structure is perpendicular to the x-y plane, and a cross section, parallel to the x-y plane, of the grating unit 221*f* is rhombic. Each grating unit 221*g* of a grating structure 22*g* in the eighth embodiment is in a shape of a triangular prism shaped structure, the triangular prism shaped structure is perpendicular to the x-y plane, and a cross section, parallel to the x-y plane, of the grating unit 221*g* is a triangle. Each grating unit 221*h* of a grating structure 22*h* in the ninth embodiment is in a shape of a combination structure of two trapezoidal prisms. The grating unit 221*h* is perpendicular to the x-y plane, and a cross section, parallel to the x-y plane, of the grating unit 221*h* is in a shape of two connected trapezoids. Each grating unit 221*i* of a grating structure 22*i* in the tenth embodiment is in a shape of a combination structure of two spaced triangular prisms. The grating unit 221*i* is perpendicular to the x-y plane, and a cross section, parallel to the x-y plane, of the grating unit 221*i* is in a shape of two spaced triangles. The grating structures provided in the fourth to tenth embodiments of the present disclosure may implement the orthogonal pupil expansion of ±90° to form a pupil expansion region of 180°, such that the valid output coupled grating region of the grating structure increases, thereby increasing the valid display area of the grating structure, improving the utilization rate of the grating, and improving the overall efficiency of the diffractive waveguide apparatus.

In other embodiments, the grating unit may be in a shape of one or a combination of a conical structure, a pyramid shaped structure, a frustum of a prism like structure, and a circular truncated cone shaped structure.

In other embodiments, each grating unit may be in a shape of an irregular shape or a combination of irregular shapes. Therefore, the shape of the grating unit may be designed based on a required diffraction energy distribution.

Figure 24:
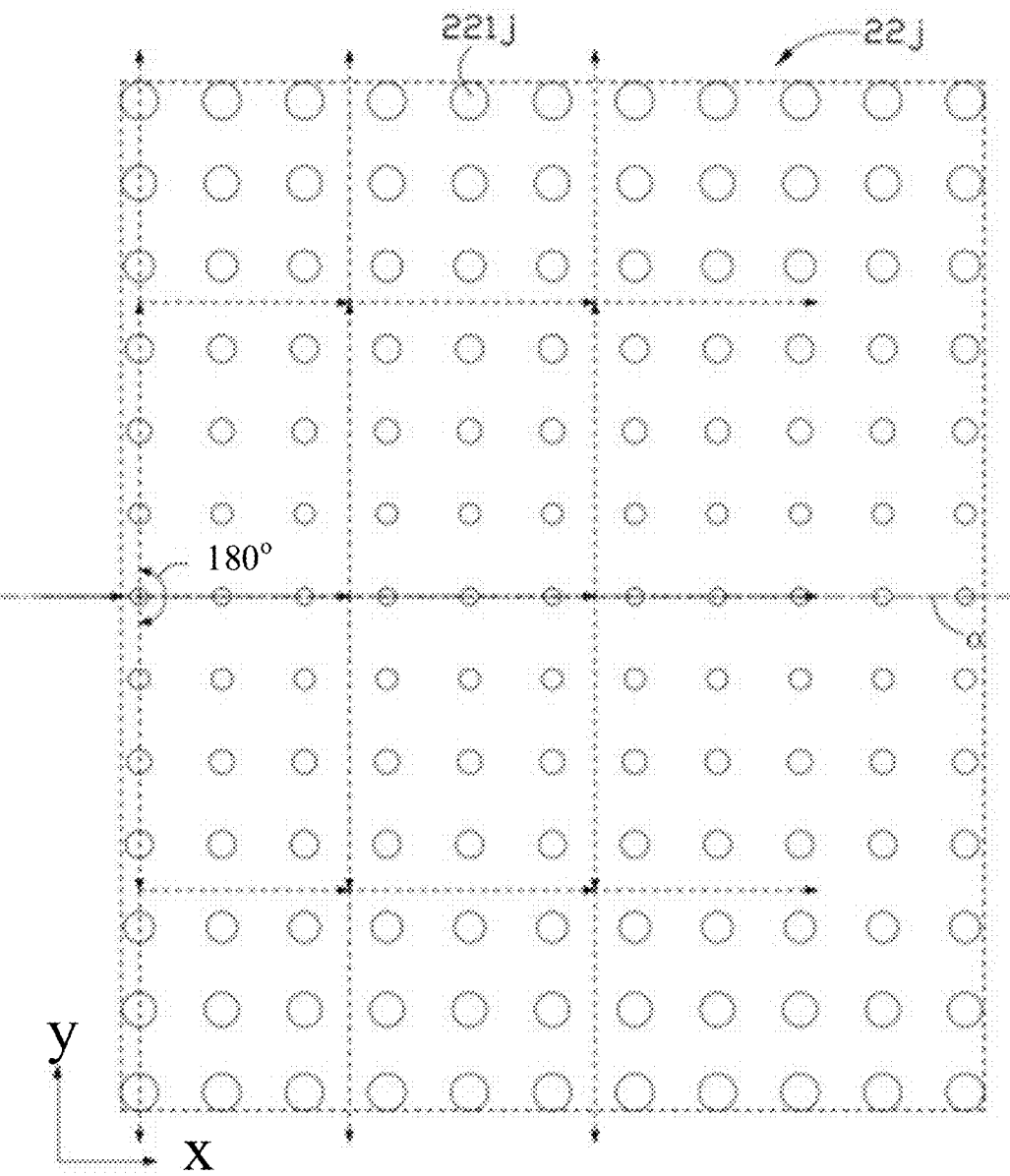
FIG. 24 is a schematic diagram of a grating structure according to an eleventh embodiments of the present disclosure.

As shown FIG. 24, FIG. 24 is a schematic diagram of a grating structure 22*j* according to an eleventh embodiments of the present disclosure. The grating structure 22*j* provided in the eleventh embodiment of the present disclosure is similar to the grating structure 22 in the first embodiment, except that the multiple grating units 221*j* in the eleventh embodiment are arrayed into a rectangular region, and duty cycles of the multiple grating units 221*j* are adjusted toward both sides of a centerline o of the rectangular region to modulate a diffraction efficiency of the multiple grating units 221*j*, and the centerline o is served as a symmetrical axis of the rectangular region and parallel to the first direction (along the x-axis direction). In the embodiments, the duty cycles of the multiple grating units 221*j* are modulated along the second direction (i.e., the y-axis direction). Specifically, radial sizes of the multiple grating units 221*j* gradually increase from the centerline o along the second direction, that is, the radial sizes of cross sections of the multiple grating units 221*j* parallel to the x-y plane gradually increase from the centerline o along the second direction. For example, when the multiple grating units 221*j* are each in a shape of a cylindrical structure, diameters of the multiple grating units 221*j* gradually increase from the centerline o to sides away from the centerline o. When the multiple grating units 221*j* are each in a shape of a square prism structure or a rectangular prism structure, sizes of multiple cross sections, parallel to the x-y plane, of the grating units 221*j* gradually increases from the centerline o to the sides away from the centerline o. The grating structure 22*j* in the embodiments are subjected to duty cycle modulation towards both sides of the centerline o which is served as the symmetrical axis and parallel to the first direction, thereby improving a diffraction efficiency of an edge of the grating structure 22*j* and ensuring a uniformity of upper and lower emitting intensities.

In other embodiments, the multiple grating units 221*j* are arrayed into a rectangular region, and the centerline o, parallel to the first direction (the x-axis direction), of the rectangular region is served as the symmetrical axis. The radial sizes of the multiple grating units may gradually decrease from the centerline o along the second direction (along the y-axis direction), that is, the radial sizes of the cross sections, parallel to the x-y plane, of the multiple grating units gradually decrease from the centerline o along the second direction. For example, when the multiple grating units are each in a shapes of cylindrical structures, the diameters of the multiple grating units gradually decrease from the centerline o towards the sides away from the centerline o. When the multiple grating units are each in a shape of a square prism structure or a rectangular prism structure, the sizes of cross sections, parallel to the x-y plane, of the multiple grating units gradually decrease from the centerline o towards the sides away from the centerline o.

In other embodiments, the multiple grating units are arrayed into a rectangular region, the duty cycles of the multiple grating units are adjusted on both sides of the centerline of the rectangular region, and the centerline is served as the symmetrical axis and is parallel to the second direction (the y-axis direction). That is, the duty cycles of the multiple grating units are modulated along the first direction (the x-axis direction) to improve the diffraction efficiency of the multiple grating units and ensure the uniformity of upper and lower emitting intensities. In some embodiments, the radial sizes of the multiple grating units gradually increase from the centerline along the first direction, that is, the radial sizes of the cross sections, parallel to the x-y plane, of the multiple grating units gradually increase from the centerline along the first direction. For example, when the multiple grating units are each in a shape of a cylindrical structure, the diameters of the multiple grating units gradually increase from the centerline towards the sides away from the centerline. When the multiple grating units are each in a shape of a square prism structure or a rectangular prism structure, the sizes of the multiple cross sections, parallel to the x-y plane, of the multiple grating units gradually increase from the centerline towards the sides away from the centerline.

In some embodiments, the multiple grating units are arrayed into a rectangular area, and the duty cycles of the multiple grating units are adjusted on both sides of the centerline of the rectangular region, the centerline is served as the symmetrical axis and parallel to the second direction (the y-axis direction), so as to improve the diffraction efficiency of the multiple grating units and ensure the uniformity of upper and lower emitting intensities. The radial sizes of the multiple grating units gradually decrease from the centerline along the first direction (the x-axis direction), that is, the radial sizes of the cross sections, parallel to the x-y plane, of the multiple grating units gradually decrease from the centerline along the first direction. For example, when the multiple grating units are each in a shape of a cylindrical structure, the diameters of the multiple grating units gradually decrease from the centerline towards the sides away from the centerline. When the multiple grating units are each in a shape of square prism structure or a rectangular prism structure, the sizes of the cross sections, parallel to the x-y plane, of the multiple grating units gradually decrease from the centerline towards the sides away from the centerline.

Figure 25:
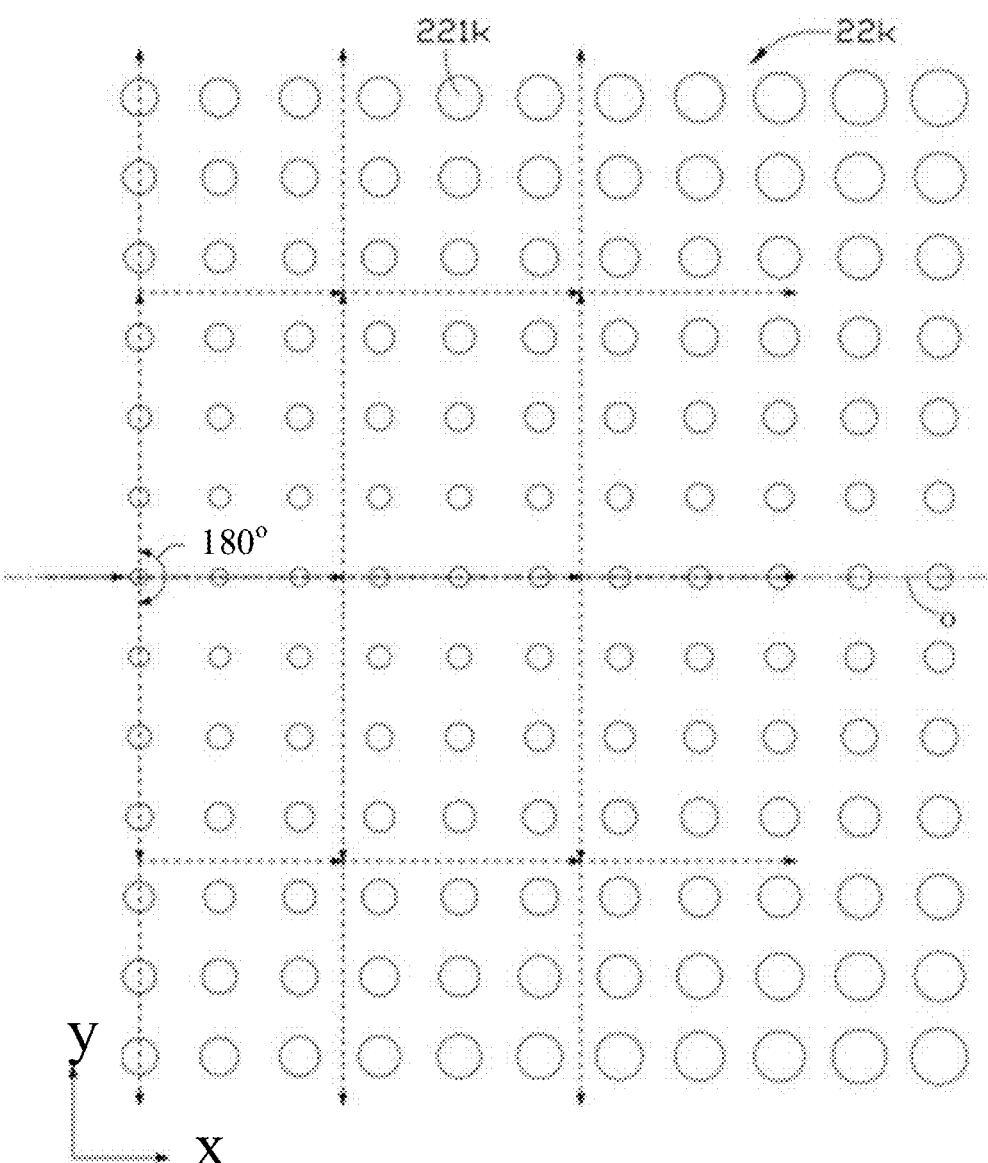
FIG. 25 is a schematic diagram of a grating structure according to a twelfth embodiment of the present disclosure.

As shown FIG. 25, FIG. 25 is a schematic diagram of a grating structure 22k according to a twelfth embodiment of the present disclosure. The grating structure 22k provided in the twelfth embodiment of the present disclosure is similar to the grating structure 22j in the eleventh embodiment, except that the radial sizes of plurality of grating units 221k gradually increase along the first direction (along the x-axis direction), and gradually increase from the centerline o along the second direction (the y-axis direction). That is, the radial sizes of the multiple grating units 221k gradually increase along the first direction, and the radial sizes of the multiple grating units 221k gradually increase from the centerline o along the second direction, such that the radial sizes of the cross sections, parallel to the x-y plane, of the multiple grating units 221k gradually increase along the first direction, and gradually increase from the centerline o towards sides away from the centerline o. In this embodiment, the grating structures 22k are modulated simultaneously in the first and second directions to improve the uniformity in both directions, thereby increasing the diffraction efficiency of the edge of the grating structure 22k and ensuring the uniformity of the upper and lower emitting intensities.

In some embodiments, the multiple grating units are arrayed into a rectangular area, and the duty cycles of the multiple grating units are adjusted on both sides of the centerline of the rectangular region, and the centerline is served as the symmetrical axis and parallel to the first direction (the x-axis direction), so as to improve the diffraction efficiency of the multiple grating units and ensure the uniformity of upper and lower emitting intensities. In some embodiments, the radial sizes of the multiple grating units gradually decrease along the first direction, and gradually decrease along the second direction (the y-axis direction) from the centerline. That is, the radial sizes of the multiple grating units gradually decrease along the first direction, and the radial sizes of the multiple grating units gradually decrease from the centerline along the second direction, such that the radial sizes of the cross sections, parallel to the x-y plane, of the multiple grating units gradually decrease in the first direction, and gradually decrease from the centerline towards sides away from the centerline. The grating structure in this embodiment is modulated simultaneously in the first and second directions to improve uniformity in both directions, thereby increasing the diffraction efficiency of the grating structure and ensuring the uniformity of upper and lower emitting intensities.

Figure 26:
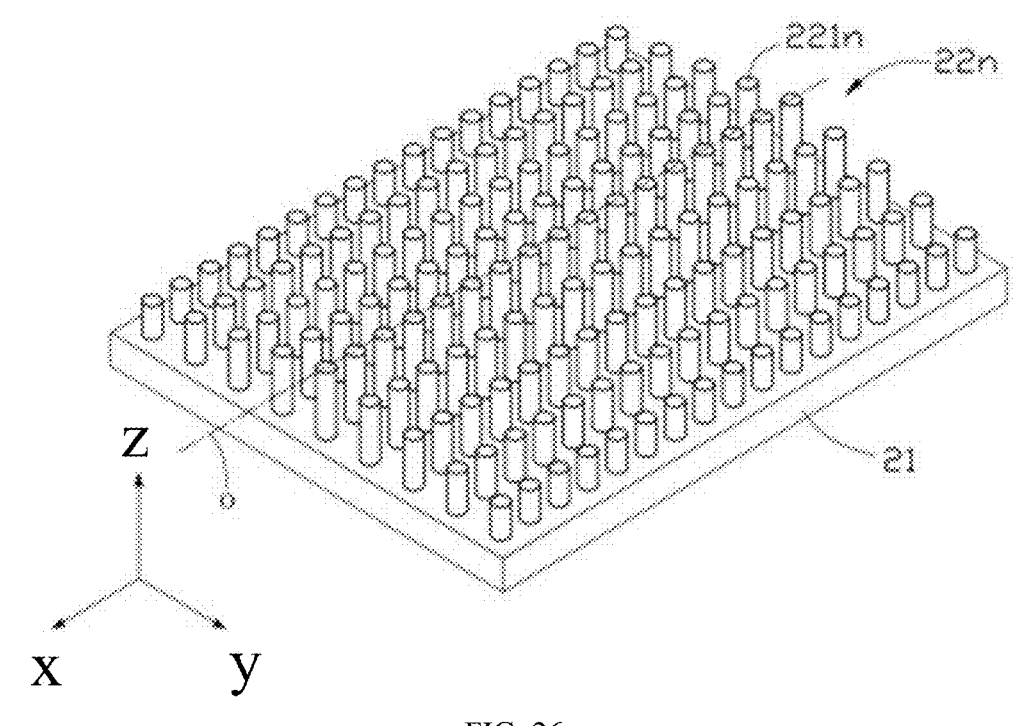
FIG. 26 is a schematic diagram of a grating structure according to a thirteenth embodiment of the present disclosure.

As shown FIG. 26, FIG. 26 is a schematic diagram of a grating structure 22n according to a thirteenth embodiment of the present disclosure. The grating structure 22n provided in the thirteenth embodiment of the present disclosure is similar in structure to the grating structure 22 of the first embodiment, except that heights of grating units 221n of the grating structure 22n may be modulated. In some embodiments, the multiple grating units are arrayed into a rectangular region, and the heights of the multiple grating units 221n are adjusted on both sides of the centerline o of the rectangular region, and the centerline o is served as the symmetrical axis and parallel to the first direction (the x-axis direction). That is, extension lengths of the multiple grating units 221n in the Z-direction are adjusted. In some embodiments, the heights of the multiple grating units 221n gradually decrease from the centerline o towards two opposite sides along the second direction (the y-axis direction). The centerline of the grating structure is served as the symmetrical axis, and the grating units 221n in this embodiment are adjust the height towards the opposite sides along the second direction, thereby modulating the diffraction efficiency of the grating structure 22n and improving the uniformity.

In some embodiments, the multiple grating units are arrayed into a rectangular region. The center line o, parallel to the first direction (along the x-axis direction), of the rectangular region are served as the symmetrical axis, and the heights of the multiple grating units gradually increase from the center line towards opposite sides o along the second direction (the y-axis direction), thereby modulating the diffraction efficiency of the grating structure and improving the uniformity.

Figure 27:
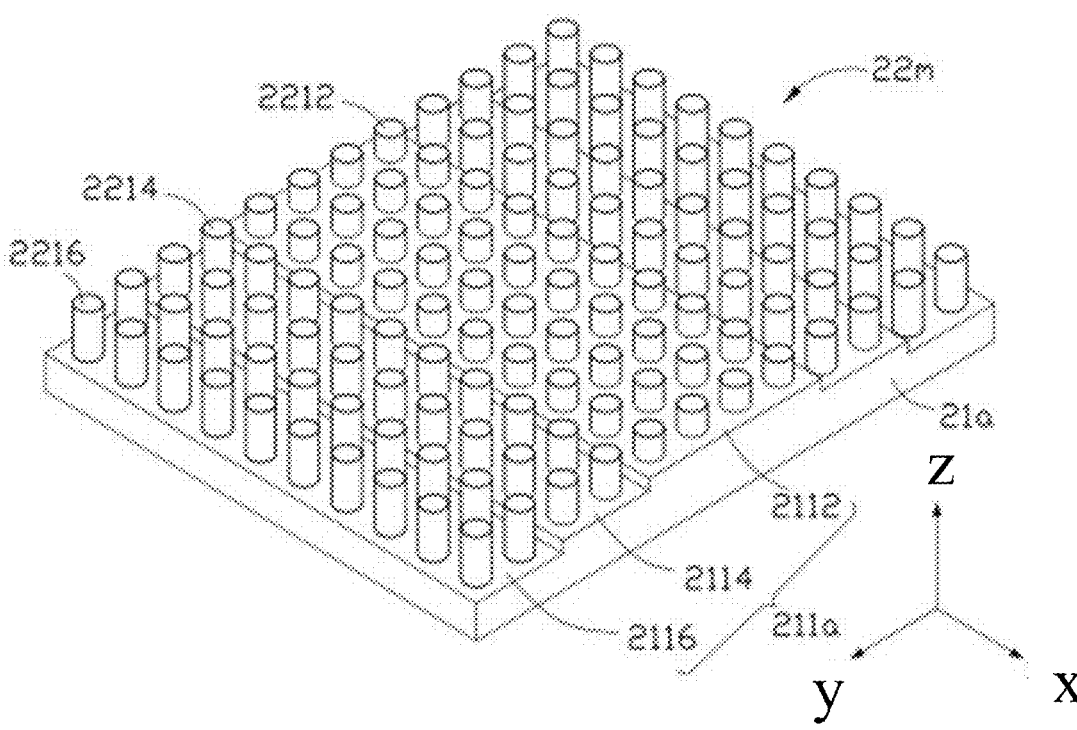
FIG. 27 is a schematic diagram of a grating structure according to a fourteenth embodiment of the present disclosure.

As shown FIG. 27, FIG. 27 is a schematic diagram of a grating structure 22m according to a fourteenth embodiment of the present disclosure. The grating structure 22m provided in the fourteenth embodiment of the present disclosure is similar to the grating structure 22 in the first embodiment, except that a surface of the waveguide substrate 21a in the fourteenth embodiment is a step surface, that is, a first surface 211a of the waveguide substrate 21a is a step surface including a first step surface 2112 located on a middle and two second step surfaces 2114 located on two opposite sides of the first step surface 2112, and the first step surface 2112 is parallel to the second step surface 2114. the multiple grating units are arranged on the first step surface 2112 and two second step surfaces 2114, and faces, away from the surface, of the multiple grating units are coplanar. In some embodiments, the first step surface 2112 protrudes from the second step surface 2114 along the Z-axis direction, and the multiple first grating units 2212 arranged on the first step surface 2112. the multiple second grating units 2214 are arranged on each second step surface 2114, and a height of the each first grating unit 2212 is smaller than that of each second grating unit 2214, that is, lengths of the first grating units 2212 extending along the z-axis are smaller than that of the second grating units 2214 extending along the z-axis. In some embodiments, end surfaces, away from the first surface 211a, of the multiple grating units are coplanar, that is, end surfaces, away from the first step surface 2112, of the first grating units 2212 are coplanar with end surfaces, away from the second step surface 2114, of the second grating units 2214. The grating structure 22m in this embodiment is modulated simultaneously in the first and second directions to improve the uniformity in both directions, thereby improving the diffraction efficiency of the grating structure and ensuring the uniformity of upper and lower emitting intensities.

In some embodiments, the step surface further includes two third step surfaces 2116 parallel to the first step surface 2112, the third step surfaces 2116 are respectively located on two sides of the two second step surfaces 2114 away from the first step surface 2112, and each second step surface 2114 protrudes from the third step surfaces 2116 along the Z-axis direction. the multiple third grating units 2216 are arranged on each third step surface 2116, and a height of each third grating unit 2216 is greater than that of each second grating unit 2214, that is, lengths of the third grating units 2216 extending along the z-axis is greater than that of the second grating units 2214 extending along the z-axis. In some embodiments, end surfaces, away from the first step surface 2112, of the first grating units 2212, end surfaces, away from the first step surface 2114, of the first grating units 2214, and end surfaces, away from the first step surface 2116, of the first grating units 2216 are coplanar.

Figure 28:
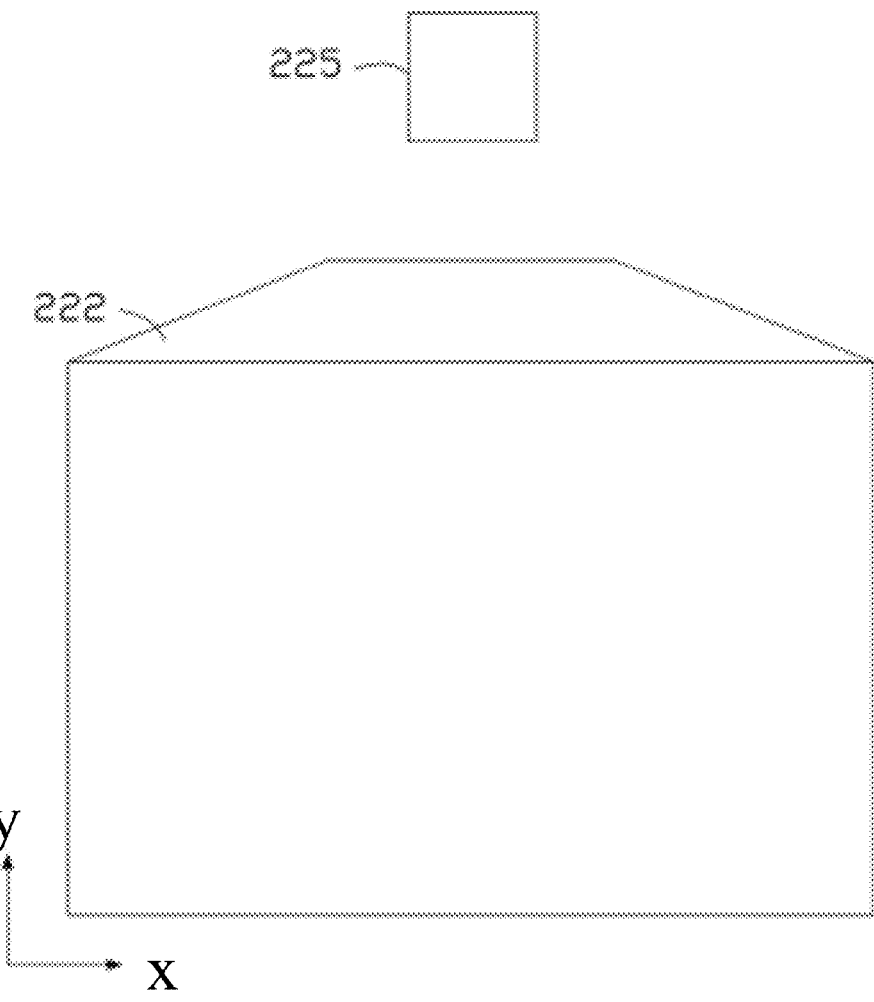
FIG. 28 is a schematic diagram of an input coupled grating and output coupled grating of a diffractive waveguide apparatus according to a fifteenth embodiment of the present disclosure.

As shown FIG. 28, FIG. 28 is a schematic diagram of an input coupled grating 225 and output coupled grating 222 of a diffractive waveguide apparatus according to a fifteenth embodiment of the present disclosure. The diffractive waveguide apparatus provided in the fifteenth embodiment of the present disclosure has a similar structure to the diffractive waveguide apparatus in the first embodiment, except that the grating structure in the fifteenth embodiment also includes the output coupled grating 222 and the input coupled grating 225 arranged on the waveguide substrate, and the input coupled grating 225 is located directly above the output coupled grating 222 (i.e., top projection mode), that is, a projection of the output coupled grating 225 along a first direction is located in a region of the output coupled grating 222, and the first direction in this embodiment is a direction along the y-axis. Structures and position relationships between the input coupled grating 225 and the output coupled grating 222 on the diffractive waveguide apparatus in the fifteenth embodiment is arranged by clockwise rotating both the input coupled grating 225 and the output coupled grating 222 in the first embodiment by 90°, such that the input coupled grating 225 is located directly above the output coupled grating 222. The primitive vector angle θ of the output coupled grating 222 in this embodiment is 90° or 80°≤θ≤100°. The period (i.e., mode length) of the first primitive vector is equal to the period (i.e., mode length) of the second primitive vector, or the period (i.e., mode length) of the first primitive vector is N times the period (i.e., mode length) of the second primitive vector, the range of N is: 0.5≤N≤2.

Figures 29, 30:
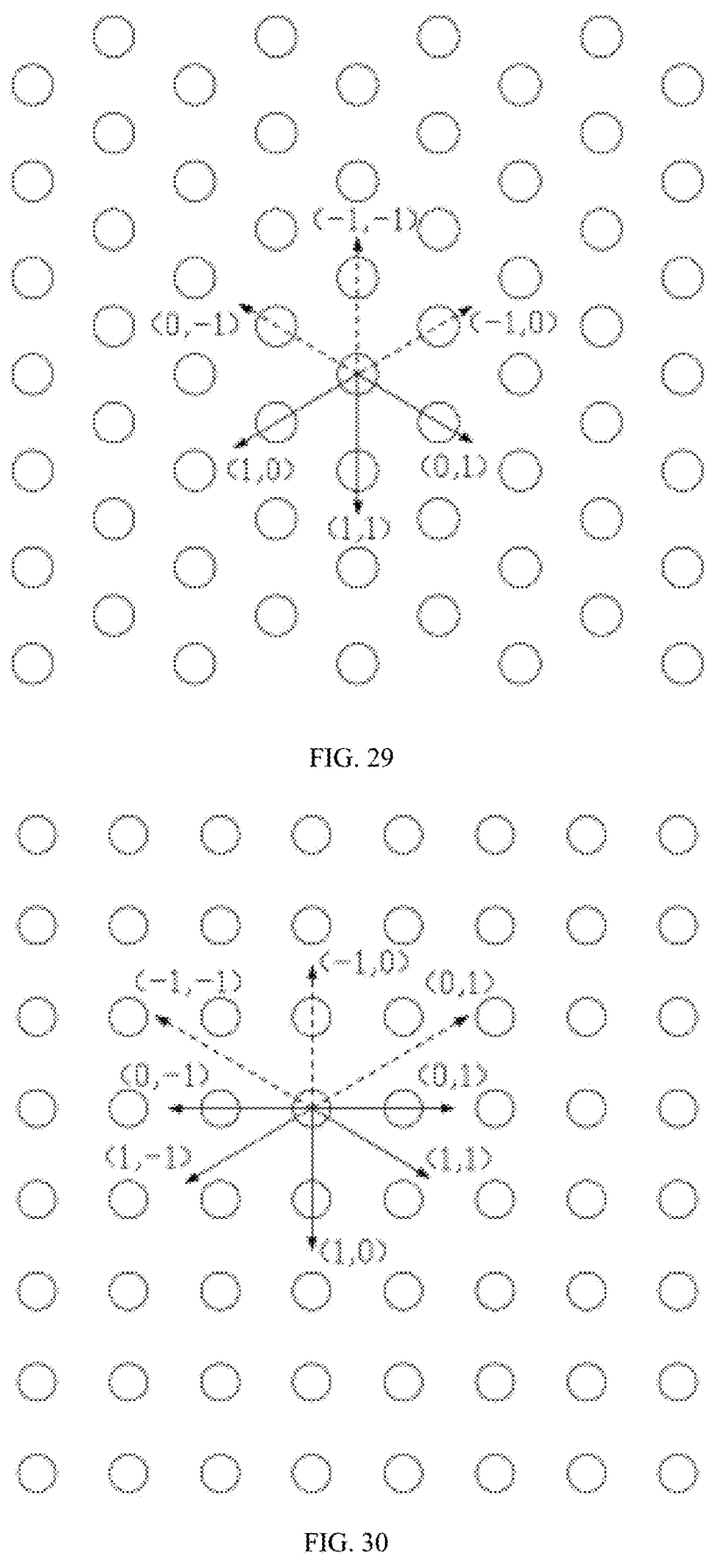

As shown FIGS. 29 and 30, FIG. 29 is a schematic diagram of a light propagation in the two-dimensional output coupled grating in the top projection mode shown in FIG. 1, and FIG. 30 is a schematic diagram of a light propagation in the output coupled grating in the top projection mode shown in FIG. 28. For the hexagonal lattice in the top projection mode in the related art, there are three diffraction orders having an impact on human visual perception, i.e., a (1,1) level diffraction, a (1,0) level diffraction, and a (0,1) level diffraction shown in FIG. 29. For the rectangular lattice in the top projection mode shown in FIG. 28, there are five diffraction orders having an impact on human visual perception, i.e., a (1,0) order diffraction, a (1,1) order diffraction, a (0,1) order diffraction, and a (0,1) order diffraction shown in FIG. 30. The solid lines shown in FIGS. 29 and 30 represent wave vectors forming diffraction patterns in a view, while the broken lines indicate that rainbow patterns cannot be formed in the view.

Figure 31:
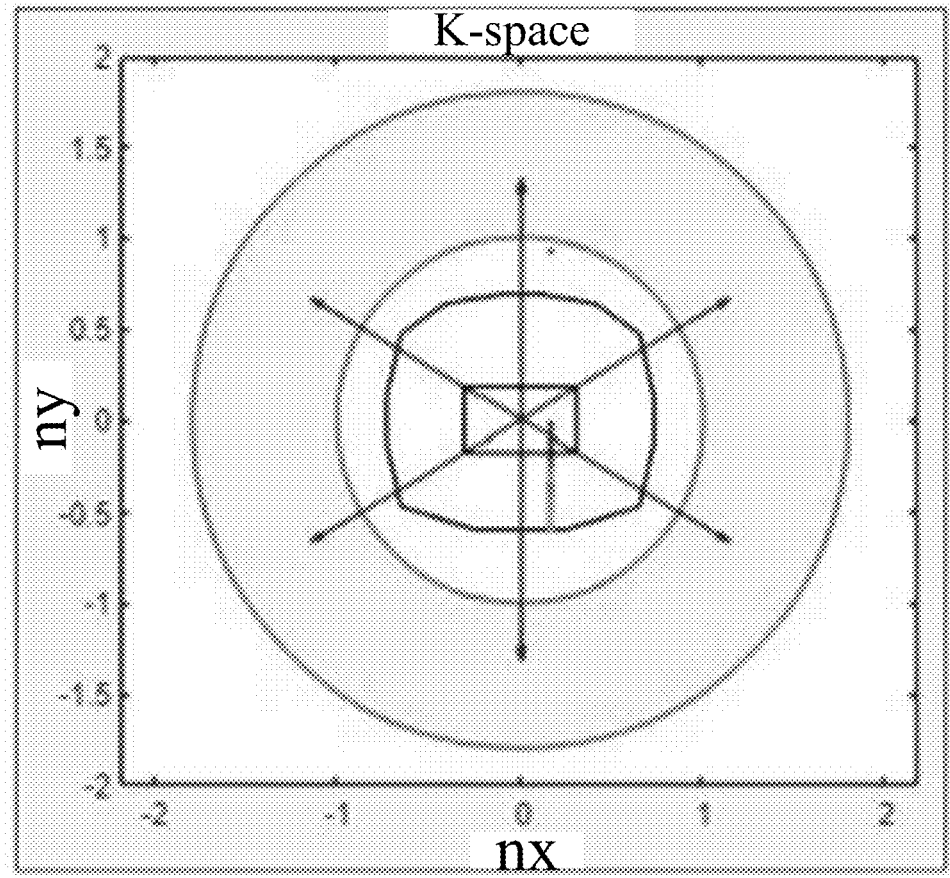
FIG. 31 is a schematic diagram of a simulated rainbow pattern of a (1,1) order diffraction performed by the two-dimensional output coupled grating shown in FIG. 29.
Figure 32:
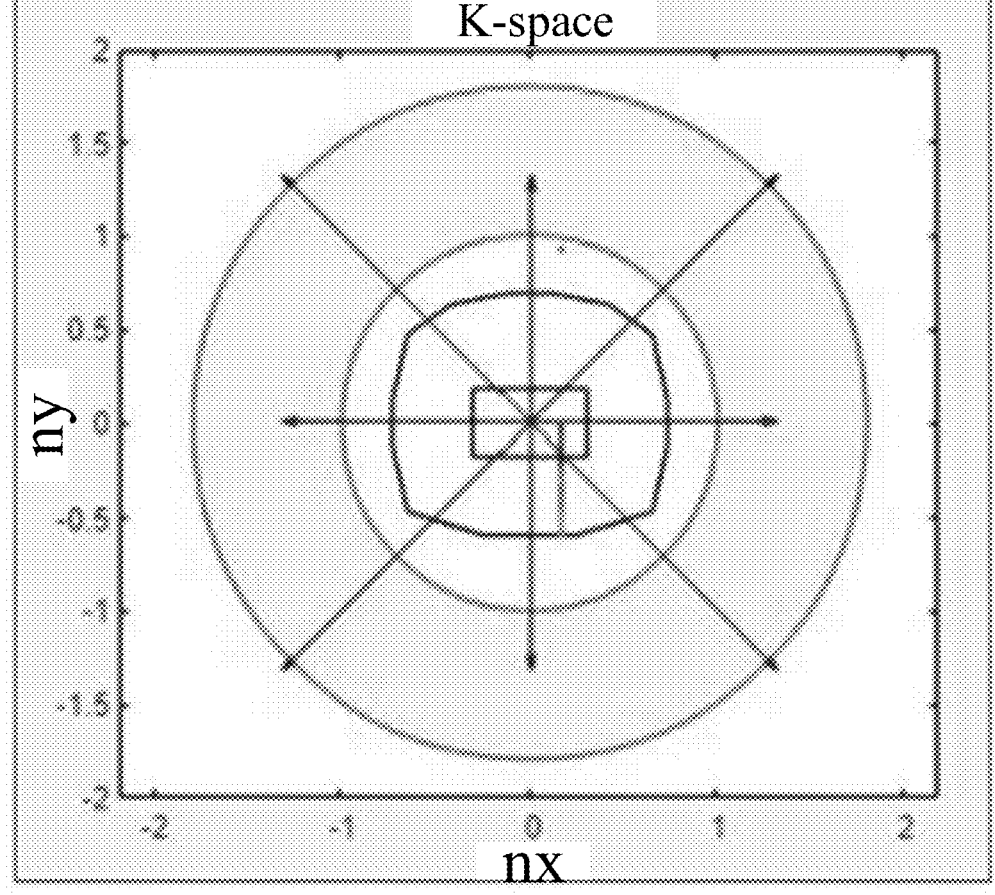
FIG. 32 is a schematic diagram of a simulated rainbow pattern of a (1,0) order diffraction performed by the output coupled grating shown in FIG. 30.

As shown FIGS. 31 and 32, FIG. 31 is a schematic diagram of a simulated rainbow pattern of a (1,1) order diffraction performed by the two-dimensional output coupled grating shown in FIG. 29, and FIG. 32 is a schematic diagram of a simulated rainbow pattern of a (1,0) order diffraction performed by the output coupled grating shown in FIG. 30. From FIGS. 31 and 32, it may be seen that, in order to match the wave vector of the input coupled grating, a rainbow pattern simulation diagram of the output coupled grating (i.e., hexagonal lattice) in the top projection mode in the related art is consistent in a direction and size with a rainbow pattern simulation diagram of the output coupled grating (i.e., rectangular lattice) in the top projection mode in some embodiments of the present disclosure. That is, the rainbow patterns formed by the two are completely consistent. Therefore, the output coupled grating in some embodiments of the present disclosure cannot weaken a rainbow pattern effect in an overhead region.

Figure 33:
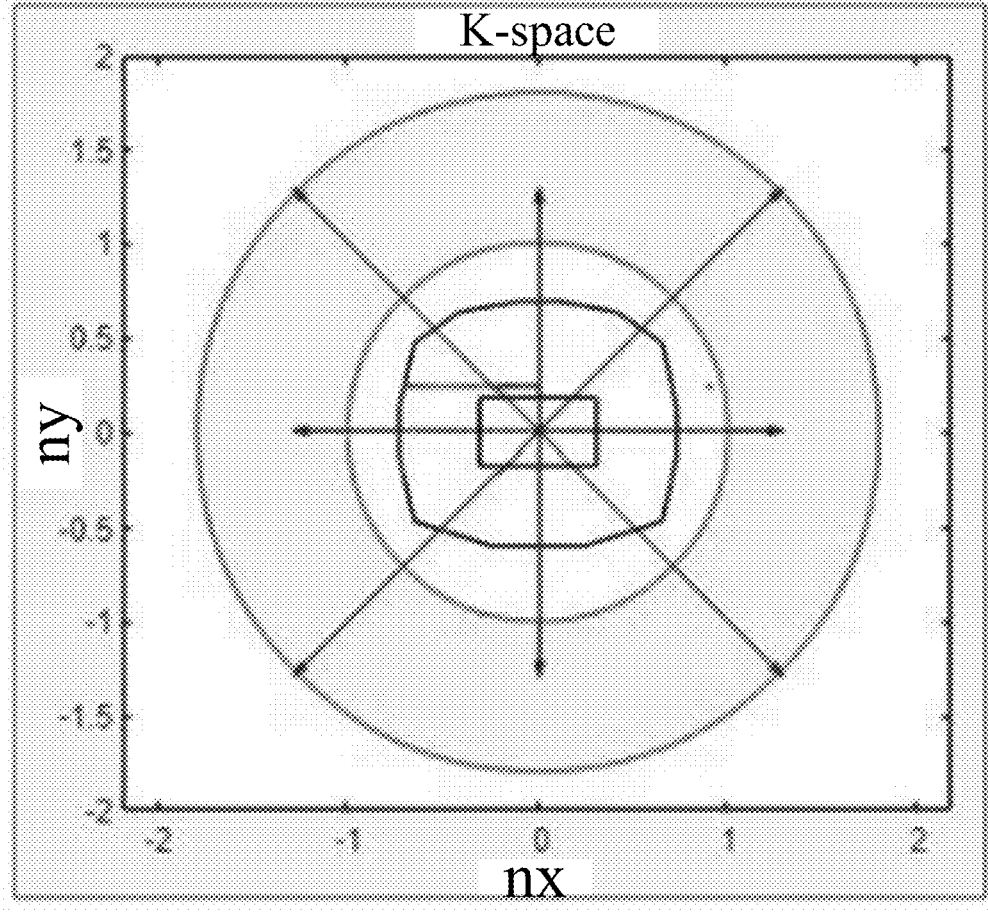
FIG. 33 is a schematic diagram of a simulated rainbow pattern of a (1,0) order diffraction and a (0,1) order diffraction performed by the two-dimensional output coupled grating shown in FIG. 29.
Figure 34:
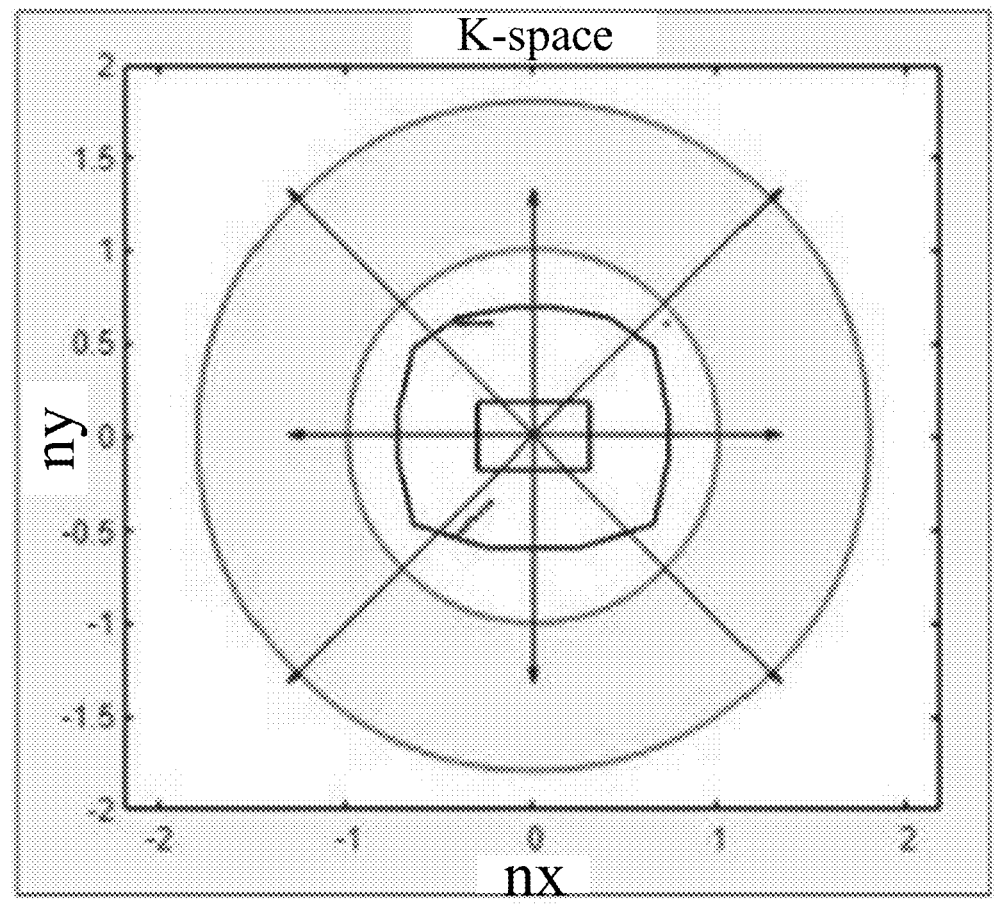
FIG. 34 is a schematic diagram of a simulated rainbow pattern of a (1,−1) order diffraction and a (1,1) order diffraction performed by the output coupled grating shown in FIG. 30.

As shown FIGS. 33 and 34, FIG. 33 is a schematic diagram of a simulated rainbow pattern of a (1,0) order diffraction and a (0,1) order diffraction performed by the two-dimensional output coupled grating shown in FIG. 29, and FIG. 34 is a schematic diagram of a simulated rainbow pattern of a (1,−1) order diffraction and a (1,1) order diffraction performed by the output coupled grating shown in FIG. 30. From FIGS. 29 and 33, it may be seen that the output coupled grating (i.e., hexagonal lattices) in the top projection mode in the related art has a (1,0) order diffraction and a (0,1) order diffraction. From FIGS. 30 and 34, it may be seen that the output coupled grating (i.e., rectangular lattice) in the top projection mode in some embodiments of the present disclosure has a (1, −1) order diffraction and (1, 1) order diffraction, the two output coupled gratings are similar in angle. The top projection mode of the output coupled grating in some embodiments of the present disclosure is in a left side of 45° direction or a right side of 45° direction. The directions of the wave vectors of the square lattice, rectangular lattice, or oblique lattice are determined by the period and the angle, and are generally substantially 45°. Since the angle between kx and ky is substantially 90°, the vector size of diffraction wave vector is the superposition of the vectors in the kx and ky directions, such that vector of the diffraction vector is longer than that of the output coupled grating (i.e., hexagonal lattice) in the related art, and the resulting diffraction patterns are away from the view (as shown in FIG. 34). Based on this mechanism, the output coupled grating in the top projection mode in some embodiments of the present disclosure may validly reduce the rainbow pattern caused by the upper right or upper left light source.

Different from the output coupled grating (i.e., hexagonal lattice) in the top projection mode in the related art, the output coupled grating (i.e., rectangular lattice) in the top projection mode in some embodiments of the present disclosure has an additional (0,1) order diffraction and a (0,1) order diffraction, which enables the light source in the left or right front to form diffraction pattern.

In summary, compared with the output coupled grating (i.e., hexagonal lattice) in the top projection mode in the related art, the output coupled grating (i.e., rectangular lattice) in the top projection mode in some embodiments of the present disclosure does not improve the rainbow pattern formed by the light source in the directly above, and has a significant improvement effect on the rainbow pattern of light source on the left and right upper, but may cause rainbow patterns on the left or right front formed by the light source. However, the light source often appears in directly above or the left and right above. In this way, compared with the coupled grating (i.e., hexagonal lattice) in the related art, the rainbow pattern of the output coupled grating (i.e., rectangular lattice) in the top projection mode in some embodiments of the present disclosure has a significant improvement.

Figure 35:
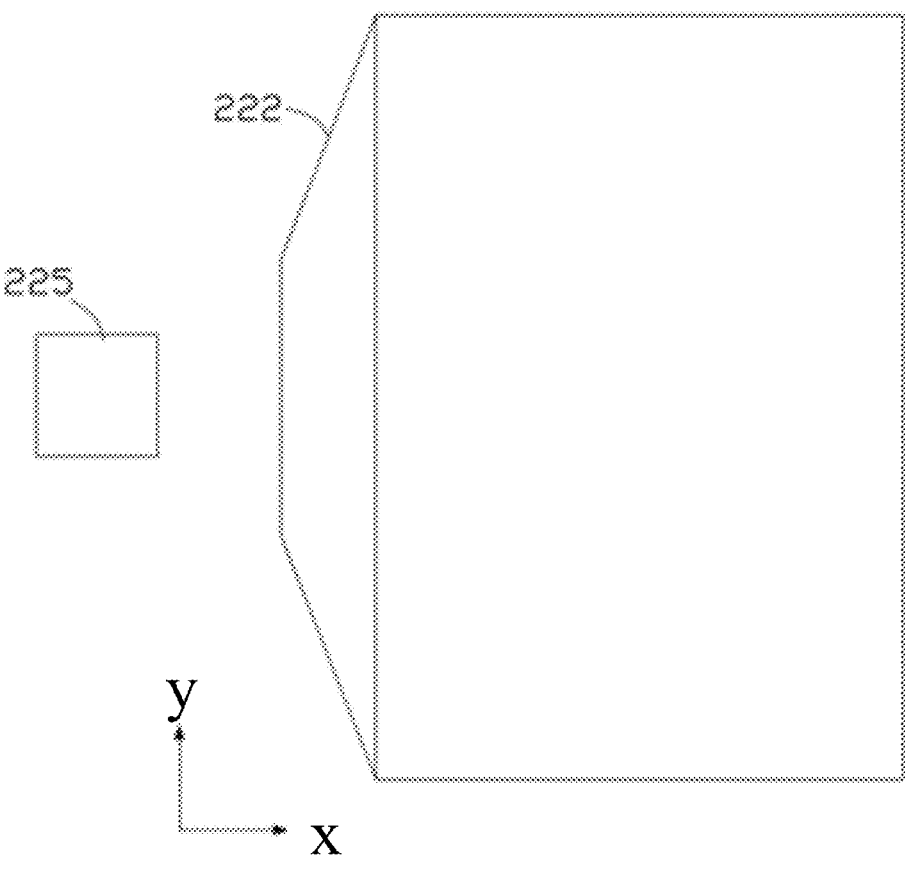
FIG. 35 is a schematic diagram of an input coupled grating and output coupled grating of a diffractive waveguide apparatus according to a sixteenth embodiment of the present disclosure.

As shown FIG. 35, FIG. 35 is a schematic diagram of an input coupled grating and output coupled grating of a diffractive waveguide apparatus according to a sixteenth embodiment of the present disclosure. The diffractive waveguide apparatus provided in the sixteenth embodiment of the present disclosure has a similar structure to the diffractive waveguide apparatus in the fifteenth embodiment, except that the input coupled grating 225 is located on one side of the output coupled grating 222 (i.e., side projection mode), that is, a projection of the coupled grating 225 along a second direction is located on a region of the output coupled grating 222, and the second direction in this embodiment is a direction along the x-axis. Structures and position relationships between the input coupled grating 225 and the output coupled grating 222 on the diffractive waveguide apparatus in the sixteenth embodiment is arranged by counterclockwise rotating both the input coupled grating 225 and the output coupled grating 222 in the fifteenth embodiment by 90°, such that the input coupled grating 225 is located one side of the output coupled grating 222. The primitive vector angle θ of the output coupled grating 222 in this embodiment is 90 or 80°≤θ≤100°. The period (i.e., mode length) of the first primitive vector is equal to the period (i.e., mode length) of the second primitive vector, or the period (i.e., mode length) of the first primitive vector is N times the period (i.e., mode length) of the second primitive vector, the range of N is: 0.5≤N≤2.

The effect of the input coupled grating 225 located on the side of the output coupled grating 222 in this embodiment on the rainbow pattern is the same as the effect of the input coupled grating 225 located directly above the output coupled grating 222 in the fifteenth embodiment on the rainbow pattern. In the analysis in the present disclosure, the rainbow pattern of the output coupled grating (i.e., rectangular lattice) is related to the ratio of period. When the period in the vertical direction (y-axis direction) is less than the period in the horizontal direction (x-axis direction), the rainbow pattern in the vertical direction will move away from the view. Conversely, the rainbow pattern will move towards the center of the view. For the oblique lattice, the effect is also similar to the effect to the rectangular lattice. In addition, the rainbow pattern will be slightly shifted to the left or right, but regardless of which lattice has a relieving effect on the rainbow pattern caused by the upper left and upper right light sources. The principle is descried in the fifteenth embodiment.

Figure 36:
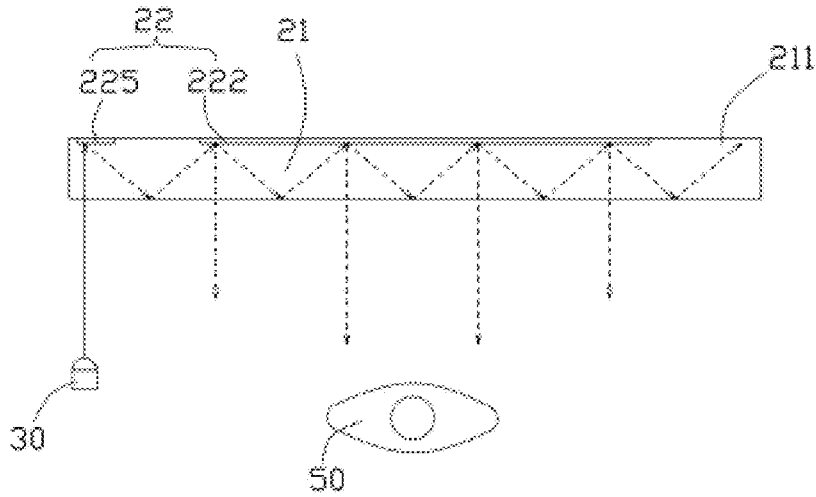
FIG. 36 is a structural schematic diagram of a diffractive waveguide apparatus according to a seventeenth embodiment of the present disclosure.

As shown FIG. 36, FIG. 36 is a structural schematic diagram of a diffractive waveguide apparatus according to a seventeenth embodiment of the present disclosure. The diffractive waveguide apparatus provided in the seventeenth embodiment of the present disclosure has a similar structure to the diffractive waveguide apparatus in the first embodiment, except that in the seventeenth embodiment, a first receiving groove and a second receiving groove are defined on the first surface 211 of the waveguide substrate 21, the first receiving groove is spaced apart from the second receiving groove, the input coupled grating 225 is arranged in the first receiving groove, and the output coupled grating 222 is arranged in the second receiving groove. The primitive vector angle θ of the output coupled grating 222 is 90 or 80°≤θ≤100°. The length of period (i.e., mode length) of the first primitive vector is equal to the length of the period (i.e., mode length) of the second primitive vector, or the length of the period (i.e., mode length) of the first primitive vector is N times the length of the period (i.e., mode length) of the second primitive vector, the range of N is: 0.5≤N≤2. In this embodiment, the primitive vector angle θ of the output coupled grating 222 is 90°, an absolute value of the first period (i.e., first mode length) is equal to N times an absolute value of the second period (i.e., second mode length), that is, the range of N is 0.5≤|N|≤2. The output coupled grating region of the output coupled grating 222 is rectangular, such that the two-dimensional pupil expansion angle of the output coupled grating 222 is 180°.

Figure 37:
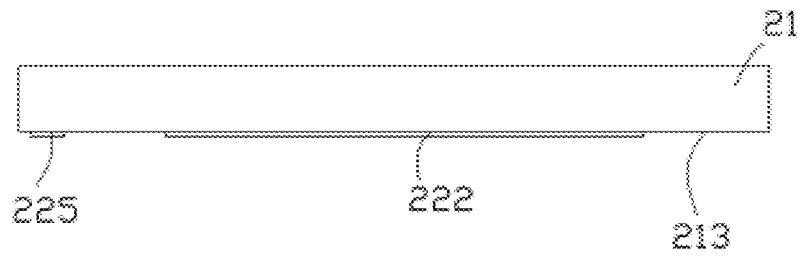
FIG. 37 is a structural schematic diagram of a diffractive waveguide apparatus according to an eighteenth embodiment of the present disclosure.

As shown FIG. 37, FIG. 37 is a structural schematic diagram of a diffractive waveguide apparatus according to an eighteenth embodiment of the present disclosure. The diffractive waveguide apparatus provided in the eighteenth embodiment of the present disclosure has a similar structure to the diffractive waveguide apparatus in the first embodiment, except that the input coupled grating 225 and coupled grating 222 in the eighteenth embodiment are both arranged on the second surface 213. The primitive vector angle θ of the output coupled grating 222 is 90 or 80°≤θ≤100°, the length of the period (i.e., mode length) of the first primitive vector is equal to the length of the period (i.e., mode length) of the second primitive vector, or the length of the period (i.e., mode length) of the first primitive vector is N times the length of the period (i.e., mode length) of the second primitive vector, the range of N is: 0.5≤N≤2. In this embodiment, the primitive vector angle θ of the output coupled grating 222 is 90°, an absolute value of the first period (i.e., first mode length) is equal to N times an absolute value of the second period (i.e., second mode length), that is, the range of N is 0.5≤|N|≤2. The output coupled grating region of the output coupled grating 222 is rectangular, such that the two-dimensional pupil expansion angle of the output coupled grating 222 is 180°.

Figure 38:
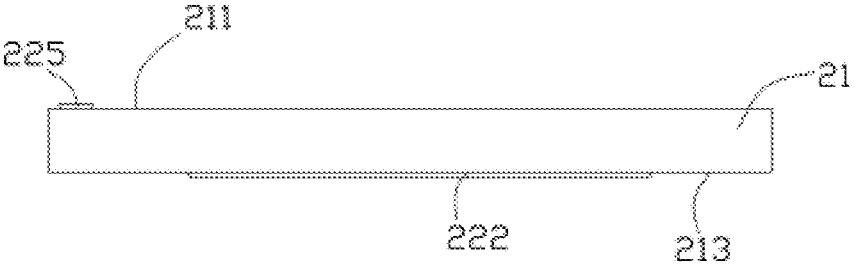
FIG. 38 is a structural schematic diagram of a diffractive waveguide apparatus according to a nineteenth embodiment of the present disclosure.

As shown FIG. 38, FIG. 38 is a structural schematic diagram of a diffractive waveguide apparatus according to a nineteenth embodiment of the present disclosure. The diffractive waveguide apparatus provided in the nineteenth embodiment of the present disclosure has a similar structure to the diffractive waveguide apparatus in the first embodiment, except that the output coupled grating 225 are arranged on the first surface 211 and the output coupled grating 222 are arranged on the second surface 213. In this embodiment, the output coupled grating 225 is arranged on the first surface 211, and the output coupled grating 222 is arranged on the second surface 213 the primitive vector angle θ of the output coupled grating 222 is 90 or 80°≤θ≤100°, the length of the period (i.e., mode length) of the first primitive vector is equal to the length of the period (i.e., mode length) of the second primitive vector, or the length of the period (i.e., mode length) of the first primitive vector is N times the length of the period (i.e., mode length) of the second primitive vector, the range of N is: 0.5≤N≤2. In this embodiment, the primitive vector angle θ of the output coupled grating 222 is 80°≤θ≤100°°, an absolute value of the first period (i.e., first mode length) is equal to N times an absolute value of the second period (i.e., second mode length), that is, the range of N is 0.5≤|N|≤2. The output coupled grating region of the output coupled grating 222 is rectangular, such that the two-dimensional pupil expansion angle of the output coupled grating 222 is 180°.

Figure 39:
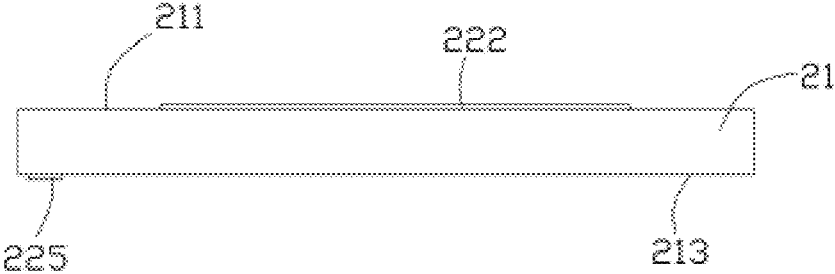
FIG. 39 is a structural schematic diagram of a diffractive waveguide apparatus according to a twentieth embodiment of the present disclosure.

As shown FIG. 39, FIG. 39 is a structural schematic diagram of a diffractive waveguide apparatus according to a twentieth embodiment of the present disclosure. The diffractive waveguide apparatus provided in the twentieth embodiment of the present disclosure has a similar structure to the diffractive waveguide apparatus in the 19th embodiment, except that the input coupled grating 225 is arranged on the second surface 213, and the output coupled grating 222 is arranged on the first surface 211.

Figure 40:
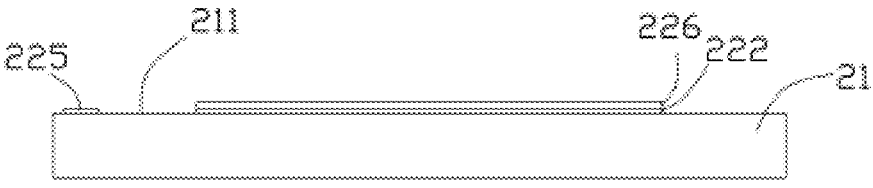
FIG. 40 is a structural schematic diagram of a diffractive waveguide apparatus according to a twenty-first embodiment of the present disclosure.

As shown FIG. 40, FIG. 40 is a structural schematic diagram of a diffractive waveguide apparatus according to a twenty-first embodiment of the present disclosure. The diffractive waveguide apparatus provided in the twenty-first embodiment of the present disclosure has a similar structure to the diffractive waveguide apparatus in the first embodiment, except that the diffractive waveguide apparatus in the twenty-first embodiment also includes a protective sheet 226, which is covered on a surface of the output coupled grating 222 away from the waveguide substrate 21 to protect the output coupled grating 222 from damage. The material of the protective sheet 226 may be, but is not limited to, glass or plastic, etc.

Figure 41:
FIG. 41 is a structural schematic diagram of a diffractive waveguide apparatus according to a twenty-second embodiment of the present disclosure.

As shown FIG. 41, FIG. 41 is a structural schematic diagram of a diffractive waveguide apparatus according to a twenty-second embodiment of the present disclosure. The diffractive waveguide apparatus provided in the twenty-second embodiment of the present disclosure has a similar structure to the diffractive waveguide apparatus in the nineteenth embodiment, except that the diffractive waveguide apparatus in the twenty-second embodiment also includes a protective sheet 226, which is covered on a surface of the output coupled grating 222 away from the waveguide substrate 21 to protect the output coupled grating 222 from damage. The material of the protective sheet 226 may be, but is not limited to, glass or plastic, etc.

In some embodiment, the output coupled grating 222 is integrated with the waveguide substrate 21.

Figures 42, 43:
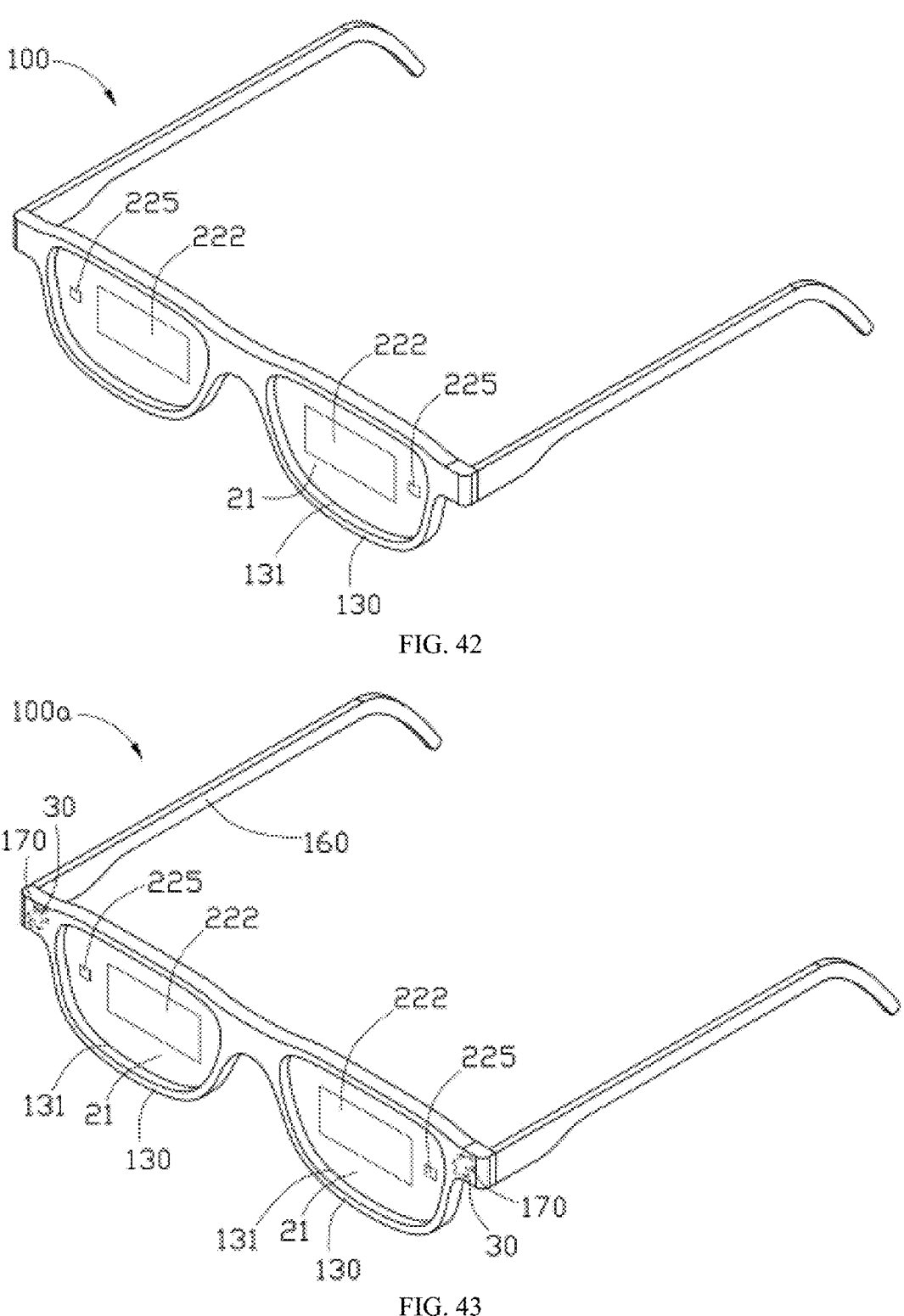
FIG. 42 is a schematic diagram of s near-eye display device according to an embodiment of the present disclosure.
FIG. 43 is a schematic diagram of s near-eye display device according to another embodiment of the present disclosure.

As shown FIG. 42, FIG. 42 is a schematic diagram of s near-eye display device 100 according to an embodiment of the present disclosure. The near-eye display device 100 includes the diffractive waveguide apparatus provided in any one of the above embodiments.

In some embodiments, the near-eye display device 100 includes a wearing frame 130 having two viewing window regions 131 spaced apart from each other, and any one of the diffractive waveguide apparatuses mentioned above is arranged on each of at least one of the two viewing window regions 131. When the diffractive waveguide apparatuses mentioned above is arranged on one of the two viewing window regions 131, the one viewing window region 131 may enable the human eye to see a virtual image, and environmental light may penetrate the output coupled grating 225 region, thereby enabling the at least one viewing window region 131 to implement the effect of AR. When two diffractive waveguide apparatus are arranged on the two viewing window regions 131, respectively, the two viewing window regions 131 may implement the effect of AR. In the schematic diagram of this embodiment, the grating structure 22 being arranged on the two viewing window regions 131 is taken as an example, each input coupled grating 225 is located on one side of a corresponding output coupled grating 222. In some embodiments, the input coupled grating 225 is located in a middle of the one side of the corresponding coupled grating 222.

As shown FIG. 43, FIG. 43 is a schematic diagram of s near-eye display device 100a according to another embodiment of the present disclosure. The near-eye display device 100a includes a wearing frame 130, a wearing holder 160, an image source 30, and an optical lens component 170. The wearing holder 160 is connected to the wearing frame 130. The image source 30 is also called a projection light machine. The image source 30 is arranged on one side of the waveguide substrate 21 to generate a light based on an image to be displayed. The optical lens component 170 is arranged between the image source 30 and the input coupled grating 225 to guide the light into the input coupled grating 225 according to a predetermined manner. At least one of the image source 30 and the optical lens component 170 is arranged at a connection of the wearing frame 130 and the wearing holder 160. Each input coupled grating 225 is located on one side of a corresponding output coupled grating 222, i.e., the side projection mode. In some embodiments, the input coupled grating 225 is located in the middle of the one side of the corresponding coupled grating 222.

In some embodiments, the near-eye display device is AR glasses, and the wearing holder 160 is also called a glasses leg.

When the near-eye display device is the AR glasses, in order to enable the waveguide substrate 21, the output coupled grating 225, and the output coupled grating 222 included in the to the waveguide substrate structure to fit a shape of the glasses, the input coupled grating 225 may be arranged close to the connection of the wearing frame 130 and the wearing holder 160. The side projection is adopted, the image source 30 and optical lens component 170 are arranged on the connection of the wearing frame 130 and the wearing holder 160, and the input coupled grating 225 is arranged on one side of the viewing window region 131. When the near-eye display device has two viewing window regions 131, the two input coupled gratings 225 are arranged on two sides corresponding to the two viewing window regions 131. When the AR glasses are worn, the two input coupled gratings 225 are located on two sides corresponding to the human eyes.

Figure 44:
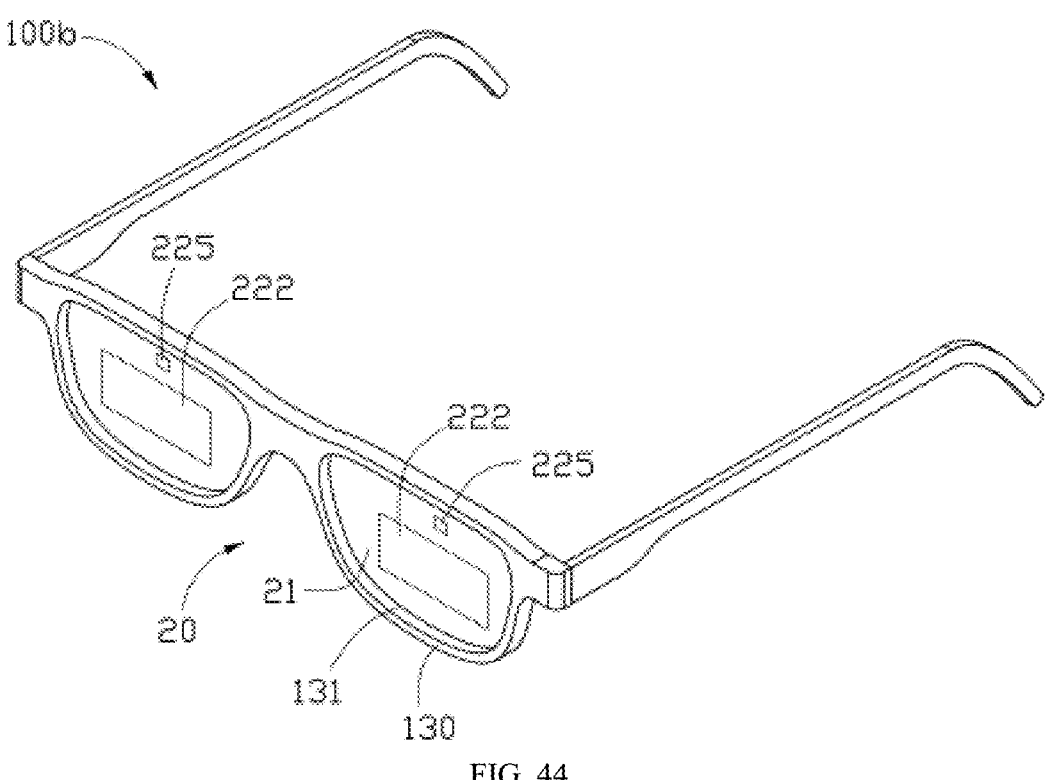
FIG. 44 is a schematic diagram of s near-eye display device according to further another embodiment of the present disclosure.

As shown FIG. 44, FIG. 44 is a schematic diagram of s near-eye display device 100b according to further another embodiment of the present disclosure. A structure of the near-eye display device 100b in this embodiment is similar to that of the above near-eye display device 100, except that the input coupled grating 225 in each viewing window region 131 is located on a top side of the output coupled grating 222, that is, the input coupled grating 225 is arranged in the top projection mode. In some embodiments, the input coupled grating 225 is located in a middle of the top side of the output coupled grating 222.

Figure 45:
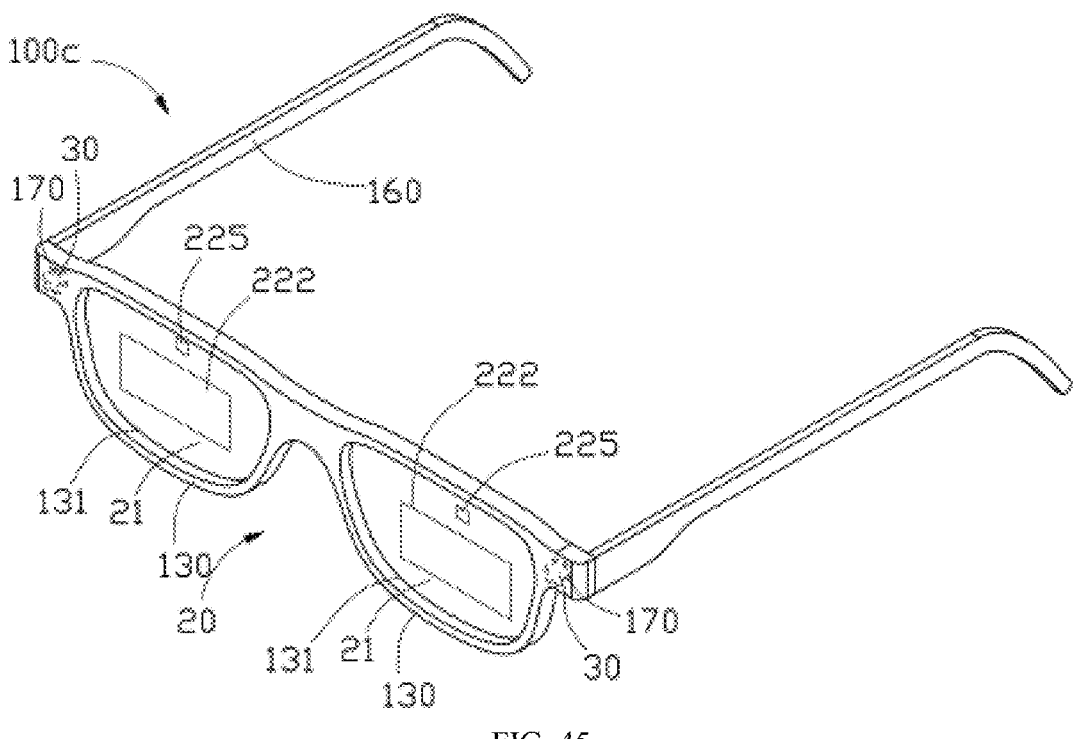
FIG. 45 is a schematic diagram of s near-eye display device according to still another embodiment of the present disclosure.

As shown FIG. 45, FIG. 45 is a schematic diagram of s near-eye display device 100c according to still another embodiment of the present disclosure. A structure of the near-eye display device 100c in this embodiment is similar to that of the above near-eye display device 100a, except that the input coupled grating 225 in each viewing window region 131 is located on a top side of the output coupled grating 222, that is, the input coupled grating 225 is arranged in the top projection mode. In some embodiments, the input coupled grating 225 is located in a middle of the top side of the output coupled grating 222.

As shown FIG. 46, FIG. 46 is a schematic diagram of s near-eye display device 100d according to still another embodiment of the present disclosure. The near-eye display device 100d includes a camera 40, an environmental sensor 60, a processor 70, and a battery 80. The image source 30, the camera 40, and the environmental sensor 60 are all electrically connected to the processor 70 for operation under control of the processor 70. The camera 40 is configured to acquire video data, and the environmental sensor 60 is configured to detect a surrounding environment. The battery 80 is configured to power the image source 30, the camera 40, the environmental sensor 60, and the processor 70.

As shown FIGS. 3 and 47, FIG. 47 is a flowchart of a manufacturing method for a diffractive waveguide apparatus according to some embodiments of the present disclosure. The manufacturing method includes following operations.

At operation S1, a waveguide substrate 21 is provided.

At operation S2, a grating structure 22 is formed on a surface of the waveguide substrate 21. The grating structure 22 includes multiple grating units 221, which have first periods in a first direction and second periods in a second direction different from the first direction. By adjusting the first periods and the second periods, a two-dimensional pupil expansion angle of the grating structure 22 is 180°.

In the operation S2, the grating structure 22 may be formed on a first surface 211 and/or a second surface 213 of the waveguide substrate 21. The grating structure 22 is formed on the surface of the waveguide substrate 21 by nanoimprinting, photolithography, etching, growth, casting, molding, or injection molding to implement mass production.

At operation S2, the grating structure 20 being formed on the surface of the waveguide substrate 21 by nanoimprinting includes: providing a master having a to-be-transferred grating structure corresponding to the grating structure 22, the to-be-transferred grating structure including grating units arranged along a first and a second periods with a primitive vector angle of 90°, a structural shape, a layout, a height, and a width of to-be-transferred grating units are consistent with a structural shape, a layout, a height, and a width of the grating units; polymerization molding a sub-mode through the master, the sub-mode having a complementary structure that complements the to-be-transferred grating structure on the master and the sub-mode forming a cavity that matches the structural shape, layout, height, and width of the grating units with the complementary structure; coating uncured grating substrate material of the grating structure 22 on the surface of the waveguide substrate 21; imprinting the uncured grating substrate material through the sub-mode to enable the uncured grating substrate material to be filled with the cavity of the sub-mode, and curing the grating substrate material to form the grating structure 22 on the surface of the waveguide substrate 21.

The grating substrate material may be resin material, such as UV cured resin material or thermal cured resin material, and the grating structure 22 may be formed by UV curing or thermal curing.

The above are implementations of some embodiments of the present disclosure. It should be pointed out that, for those skilled in the art, multiple improvements and embellishments may be made without departing from the principles of the embodiments of the present disclosure. These improvements and embellishments are also considered as the scope of the present disclosure.

What is claimed is:

1. A diffractive waveguide apparatus, comprising:
a waveguide substrate; and
a grating structure, arranged on a surface of the waveguide substrate, and comprising a plurality of grating units; wherein the plurality of grating units have a first period in a first direction and a second period in a second direction, the second direction is different from the first direction; the first period and the second period are adjustable to cause a two-dimensional pupil expansion angle of the grating structure to be 180°;
wherein the diffractive waveguide apparatus satisfies: in a field of view distribution of a normalized k-space of the grating structure, a horizontal axis is $\lambda k_x/2\pi$, a vertical axis is $\lambda k_y/2\pi$; a radius of an inner circle is an environmental refractive index, and a radius of an outer circle is a refractive index of a waveguide substrate, the inner circle and the outer circle being concentric; a center field of view is located in the inner circle, fields of view with a (0,0) order diffraction and a (−1, ±1) order diffraction are located in a ring formed between the inner circle and the outer circle, and fields of view with a (0, ±1) order diffraction are located outside the outer circle to avoid the (0, ±1) order diffraction; a pupil expansion angle of the center field of view is 180°, wherein $\lambda$ is a wavelength, $k_x$ is a grating vector along a x-direction in the reciprocal space, and $k_y$ is grating vector along a y-direction in the reciprocal space.

2. The diffractive waveguide apparatus as claimed in claim 1, wherein a range of an included angle θ between the first direction and the second direction is: 80°≤θ≤100°.

3. The diffractive waveguide apparatus as claimed in claim 1, wherein a mode length of the first period is equal to N times a mode length of the second period, and 0.5≤N≤2.

4. The diffractive waveguide apparatus as claimed in claim 1, wherein the plurality of grating units are arrayed into a rectangular region, a centerline, parallel to the first direction, of the rectangular region is served as a symmetrical axis of the rectangular region, and duty cycles of the plurality of grating units, on both opposite sides of the centerline, are adjusted to be different.

5. The diffractive waveguide apparatus as claimed in claim 4, wherein radial sizes of the plurality of grating units gradually increase from the centerline along the second direction.

6. The diffractive waveguide apparatus as claimed in claim 4, wherein radial sizes of the plurality of grating units gradually increase along the first direction, and gradually increase from the centerline along the second direction.

7. The diffractive waveguide apparatus as claimed in claim 4, wherein heights of the plurality of grating units gradually increase or decrease from the centerline towards two opposite sides along the second direction.

8. The diffractive waveguide apparatus as claimed in claim 1, wherein the surface of the waveguide substrate is a step surface, and the step surface comprises a first step surface in a middle and two second step surfaces on two opposite sides of the first step surface; the plurality of grating units are arranged on the first step surface and the two second step surfaces, and end surfaces, away from the surface, of the plurality of grating units are coplanar.

9. The diffractive waveguide apparatus as claimed in claim 8, wherein a height of each grating unit on the first step surface is less than a height of each grating unit on each of the two second step surfaces.

10. The diffractive waveguide apparatus as claimed in claim 1, wherein a first mode length of the first period is 260 nm to 500 nm, and a second mode length of the second period is 260 nm to 500 nm.

11. The diffractive waveguide apparatus as claimed in claim 1, wherein the grating structure comprises an input coupled grating and an output coupled grating that are arranged on the waveguide substrate; the input coupled grating is configured to couple a light in the waveguide substrate; the output coupled grating comprises several of the plurality of grating units, and the output coupled grating is configured to receive a light totally reflected by the waveguide substrate, perform a two-dimensional pupil expansion on the light, and couple the light out of the waveguide substrate.

12. The diffractive waveguide apparatus as claimed in claim 11, wherein the waveguide substrate comprises a first surface and a second surface arranged opposite to each other, and the input coupled grating and the coupled grating are both arranged on the first surface or the second surface; or the input coupled grating is arranged on one of the first surface and the second surface, and the output coupled grating is arranged on the other of the first surface and the second surface.

13. The diffractive waveguide apparatus as claimed in claim 11, wherein an included angle, between the first direction and the second direction, of the several of the plurality of grating units of the output coupled grating is 90°; an absolute value of the mode length of the first period is equal to N times an absolute value of the mode length of the second period, and a range of N is $0.5 \leq N \leq 2$; an output coupled grating region of the output coupled grating is rectangular in shape, and the two-dimensional pupil expansion angle of the output coupled grating is 180°.

14. The diffractive waveguide apparatus as claimed in claim 11, wherein an included angle, between the first direction and the second direction, of the several of the plurality of grating units of the output coupled grating is 90°, an absolute value of the mode length of the first period is equal to an absolute value of the mode length of the second period; an output coupled grating region of the output coupled grating is rectangular in shape, and the two-dimensional pupil expansion angle of the output coupled grating is 180°.

15. The diffractive waveguide apparatus as claimed in claim 11, wherein the output coupled grating is integrated with the waveguide substrate; or
   a projection of the input coupled grating in the first direction is located in a region of the output coupled grating; or a projection of the input coupled grating in the second direction is located in the region of the output coupled grating.

16. A near-eye display device, comprising a diffractive waveguide apparatus; wherein the diffractive waveguide apparatus comprises:
   a waveguide substrate; and
   a grating structure, arranged on a surface of the waveguide substrate, and comprising a plurality of grating units; wherein the plurality of grating units have a first period in a first direction and a second period in a second direction, the second direction is different from the first direction; the first period and the second period are adjustable to cause a two-dimensional pupil expansion angle of the grating structure to be 180°;
wherein the diffractive waveguide apparatus satisfies: in a field of view distribution of a normalized k-space of the grating structure, a horizontal axis is $\lambda k_x/2\pi$, a vertical axis is $\lambda k_y/2\pi$; a radius of an inner circle is an environmental refractive index, and a radius of an outer circle is a refractive index of a waveguide substrate, the inner circle and the outer circle being concentric; a center field of view is located in the inner circle, fields of view with a (0,0) order diffraction and a (−1, ±1) order diffraction are located in a ring formed between the inner circle and the outer circle, and fields of view with a (0, ±1) order diffraction are located outside the outer circle to avoid the (0, ±1) order diffraction; a pupil expansion angle of the center field of view is 180°; wherein $\lambda$ is a wavelength, $k_x$ is a grating vector along a x-direction in the reciprocal space, and $k_y$ is grating vector along a y-direction in the reciprocal space;
wherein the near-eye display device comprises:
a wearing frame, comprising two viewing window regions spaced apart from each other; wherein the diffractive waveguide apparatus is arranged on each of at least one of the two viewing window regions.

17. The near-eye display device as claimed in claim 16, comprising:
   a wearing holder, connected to the wearing frame;
   an image source, arranged on a side of the waveguide substrate, and configured to generate a light based on an image to be display; and
   an optical lens component, arranged between the image source and an output coupled grating of the diffractive waveguide apparatus, and configured to guide the light into the input coupled grating according to a predetermined manner; wherein at least one of the image source and the optical lens component is arranged at a connection of the wearing frame and the wearing holder.

18. A manufacturing method for a diffractive waveguide apparatus, comprising:
   S1: providing a waveguide substrate; and
   S2: forming a grating structure on a surface of the waveguide substrate; wherein the grating structure comprises a plurality of grating units, the plurality of grating units have a first period in a first direction and a second period in a second direction, the second direction is different from the first direction, the first period and the second period are adjustable to cause a two-dimensional pupil expansion angle of the grating structure to be 180°;
wherein the diffractive waveguide apparatus satisfies: in a field of view distribution of a normalized k-space of the grating structure, a horizontal axis is $\lambda k_x/2\pi$, a vertical axis is $\lambda k_y/2\pi$; a radius of an inner circle is an environmental refractive index, and a radius of an outer circle is a refractive index of a waveguide substrate, the inner circle and the outer circle being concentric; a center field of view is located in the inner circle, fields of view with a (0,0) order diffraction and a (−1, ±1) order diffraction are located in a ring formed between the inner circle and the outer circle, and fields of view with a (0, ±1) order diffraction are located outside the outer circle to avoid the (0, ±1) order diffraction; a pupil expansion angle of the center field of view is 180°; wherein $\lambda$ is a wavelength, $k_x$ is a grating vector along a x-direction in the reciprocal space, and $k_y$ is grating vector along a y-direction in the reciprocal space.

19. The manufacturing method as claimed in claim 18, wherein at S2, the grating structure is formed on the surface of the waveguide substrate by one of nanoimprinting, casting, molding, and injection molding.

* * * * *